(12) United States Patent
Singh et al.

(10) Patent No.: US 12,370,463 B2
(45) Date of Patent: Jul. 29, 2025

(54) CONTINUOUS-FLOW, WELL MIXED, MICROFLUIDIC CRYSTALLIZATION DEVICE FOR SCREENING POLYMORPHS, MORPHOLOGIES AND CRYSTALLIZATION KINETICS AT CONTROLLED SUPERSATURATION

(71) Applicant: THE BOARD OF TRUSTEES OF THE UNIVERSITY OF ILLINOIS, Urbana, IL (US)

(72) Inventors: Meenesh R. Singh, Naperville, IL (US); Paria Coliaie, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 903 days.

(21) Appl. No.: 17/616,761

(22) PCT Filed: Jun. 5, 2020

(86) PCT No.: PCT/US2020/036353
§ 371 (c)(1),
(2) Date: Dec. 6, 2021

(87) PCT Pub. No.: WO2020/247770
PCT Pub. Date: Dec. 10, 2020

(65) Prior Publication Data
US 2022/0297027 A1    Sep. 22, 2022

Related U.S. Application Data

(60) Provisional application No. 62/858,503, filed on Jun. 7, 2019.

(51) Int. Cl.
*B01D 9/00*    (2006.01)
*B01F 25/10*   (2022.01)
(Continued)

(52) U.S. Cl.
CPC ........ *B01D 9/0077* (2013.01); *B01D 9/0013* (2013.01); *B01D 9/0036* (2013.01);
(Continued)

(58) Field of Classification Search
CPC .. B01D 9/0013; B01D 9/0036; B01D 9/0054; B01D 9/0063; B01D 9/0072;
(Continued)

(56) References Cited

U.S. PATENT DOCUMENTS 7,976,789 B2 * 7/2011 Kenis ................. B01F 25/4521
422/600
2003/0226806 A1 * 12/2003 Young .................... B01F 33/30
216/2

(Continued)

FOREIGN PATENT DOCUMENTS

EP    1666132 A1    6/2006
EP    2090353 A1    8/2009

OTHER PUBLICATIONS

Coliaie et al., Continuous-flow, well-mixed, microfluidic crystallization device for screening of polymorphs, morphology, and crystallization kinetics at controlled supersaturation, Lab Chip, 19:2373 (2019).

(Continued)

*Primary Examiner* — Jennifer Wecker
(74) *Attorney, Agent, or Firm* — MARSHALL, GERSTEIN & BORUN LLP

(57) ABSTRACT

The disclosure relates to a microfluidic system for the screening of polymorphs, morphology, and crystallization kinetics under well-mixed, continuous-flow at controlled supersaturations. The disclosure also relates to a method for screening crystalline polymorphs and morphology, and crystallization kinetics. The microfluidic system includes a microfluidic chamber having one or more inlets, a passive (Continued)

mixing zone, and a trap zone. The passive mixing zone promotes mixing of solvent, solute, and optionally antisolvent under stable, controlled levels of supersaturation. The trap zone similarly has stable, controlled levels of supersaturation and correspondingly low velocity to retain solute crystals formed in the trap zone for time-dependent evaluation.

34 Claims, 11 Drawing Sheets

(51) Int. Cl.
  *B01F 33/301* (2022.01)
  *B01F 35/90* (2022.01)
  *B01L 3/00* (2006.01)
  *B01F 101/23* (2022.01)

(52) U.S. Cl.
  CPC ......... *B01D 9/0054* (2013.01); *B01D 9/0063* (2013.01); *B01D 9/0072* (2013.01); *B01F 25/1041* (2022.01); *B01F 33/3017* (2022.01); *B01F 35/90* (2022.01); *B01L 3/502715* (2013.01); *B01F 2035/98* (2022.01); *B01F 2101/23* (2022.01); *B01L 2200/16* (2013.01); *B01L 2300/0663* (2013.01); *B01L 2300/18* (2013.01); *B01L 2400/0605* (2013.01)

(58) Field of Classification Search
  CPC ............... B01D 9/0077; B01F 2035/98; B01F 2101/23; B01F 25/10; B01F 25/1041; B01F 33/30; B01F 33/3017; B01F 35/90; B01F 35/92; B01L 2200/0694; B01L 2200/16; B01L 2300/0663; B01L 2300/0832; B01L 2300/0867; B01L 2300/18; B01L 2400/0605; B01L 3/502715
  See application file for complete search history.

(56) References Cited

U.S. PATENT DOCUMENTS

| | | |
|---|---|---|
| 2004/0005255 A1 | 1/2004 | Green |
| 2004/0028582 A1 | 2/2004 | Carpenter et al. |
| 2007/0178582 A1* | 8/2007 | Koser ............... B01L 3/502753 435/297.5 |
| 2009/0269250 A1* | 10/2009 | Panagiotou ............. B01F 25/23 422/129 |
| 2014/0329231 A1* | 11/2014 | Magniette .............. G01N 21/03 435/7.1 |
| 2015/0217264 A1 | 8/2015 | Doya et al. |
| 2018/0169654 A1* | 6/2018 | Archibald .......... A61K 51/0491 |

OTHER PUBLICATIONS

International Application No. PCT/US2020/036353, International Search Report and Written Opinion, mailed Sep. 21, 2020.

* cited by examiner

CONTINUOUS-FLOW, WELL MIXED, MICROFLUIDIC CRYSTALLIZATION DEVICE FOR SCREENING POLYMORPHS, MORPHOLOGIES AND CRYSTALLIZATION KINETICS AT CONTROLLED SUPERSATURATION

CROSS REFERENCE TO RELATED APPLICATION

This application is a National Stage application of International Application No. PCT/US20/36353, filed Jun. 5, 2020, which claims priority to U.S. Provisional Application No. 62/858,503 (filed on Jun. 7, 2019), each of which is incorporated herein by reference in its entirety.

STATEMENT OF GOVERNMENT INTEREST

None.

BACKGROUND OF THE DISCLOSURE

Field of the Disclosure

The disclosure relates to a microfluidic system suitable for screening of crystalline polymorphs and morphology under a controlled, continuous-flow, supersaturated environment. The disclosed device provides continuous crystallization of solute, for example, by mixing with an antisolvent and/or cooling a saturated solution.

Brief Description of Related Technology

Crystallization is an industrially important unit operation for the isolation, purification, and manufacture of a wide range of inorganic and organic materials, including pharmaceuticals, agrochemicals, semiconductors, catalysts, metal-organic frameworks, and other specialty chemicals. Developing and subsequently controlling a crystallization process is challenging due to various factors such as solute, solvent, co-solvent, additives, pH, temperature, pressure, and hydrodynamic conditions affecting the physical properties of crystals. It is often required to isolate consistently a desired polymorphic or solvate form of crystalline material while maintaining the high crystal quality with respect to morphology (or shape) and size distribution.

Organic molecules such as active pharmaceutical ingredients (APIs) can take multiple polymorphic forms with distinctive physiochemical properties, affecting bioavailability in the human body when administered in the oral form. Therefore, the theoretical or experimental understanding of polymorphism is important in the early stages of drug development and during phase trials in pharmaceutical industries. Since most of the theoretical models rely on parameters estimated from representative crystallization experiments, their scope of predicting the polymorphs, morphology, and size of crystals is limited to the range of those crystallization conditions and usually fail to predict crystallization beyond the conditions used to estimate model parameters. Therefore, experimental screening techniques are frequently employed in the early stage of crystallization process development to identify solution composition and crystallization conditions favoring specific polymorphs and morphology of crystals.

Screening systems are generally classified according to their size scales or amount of required API for each experiment. The screening techniques to identify crystal polymorphs and morphology can be categorized into four types based on their size scales: i) 100 mL-1 L batch crystallizers, ii) mini-batch crystallizers, iii) microtiter plates, and iv) micro-fluidic devices. The 100 mL-1 L batch crystallizers typically use a few grams to 100 grams of solute to study growth and nucleation kinetics under well-mixed and well-controlled conditions. This is an expensive and time-consuming process to vary several solution compositions and crystallization conditions. The mini-batch crystallizers of 1 mL volume have a similar design compared to 100 mL-1 L batch crystallizers. However, the smaller size crystallizer allows a parallel operation to screen crystallization conditions, but these crystallizers result in the breakage of crystals due to magnetic stirring. Microtiter plates of 96,384 or 1584 wells holding volumes from 1 mL to as low as 1 µL can evaluate up to 192 conditions per run and approximately 10,000 conditions per day to screen salts, co-crystals, polymorphs, and solubility. The microtiter plate technique has also been fully automated for high-throughput screening, which requires a small amount of API in each experiment and is amenable to a solid-state analysis of crystals using either X-ray diffraction or Raman spectroscopy. Microfluidic crystallization is a relatively nascent technology that requires a much smaller volume (e.g., less than 1 µL) and API material per compartment to screen up to 2,500 conditions per run.

The compartments in the foregoing screening techniques (i-iv) are similar to a well-mixed batch crystallizer, where the external conditions such as temperature and solvent composition can be maintained constant, but the internal conditions such as supersaturation decrease continuously due to nucleation and growth of crystals and thereby influencing the polymorph formation. Since supersaturation affects the polymorphs, morphology, size of crystals, and crystallization kinetics, the screening techniques may produce relevant polymorphs initially, but then those polymorphs and the associated morphology may gravitate towards a different form due to decreasing supersaturation.

Thus, there remains a need for a controlled screening technique where crystals can be nucleated and grown under controlled, continuous-flow, supersaturation conditions to facilitate the crystallization development process.

SUMMARY

Continuous crystallization systems for polymorph screening have not been widely explored mainly due to the complexity of providing a well-mixed condition, monitoring, and tracking of crystals in a continuous flow system. For example, it is difficult to achieve a well-mixed condition in a continuous-flow microfluidic device in the absence of convective or mechanical mixing. Moreover, it is difficult to track and monitor single crystals when crystallization is occurring in a flowing solution. In addition, such in-flow crystallization is similar to batch crystallization, where the supersaturation in a small volume of solution carrying crystals is depleting constantly as crystals are nucleating and growing in it. The disclosed microfluidic system advantageously overcomes these issues by providing a mechanism to trap crystals in a continuous-flow device while constantly feeding a supersaturated solution to the trapped crystals. The disclosed microfluidic device advantageously can be fabricated using cost-effective production methods such as, for example, additive technologies (e.g., 3D printing).

In one aspect, the disclosure provides a microfluidic system comprising (a) a microfluidic chamber comprising (i) a first inlet zone (e.g., first thermalizer zone) in fluid communication with a first inlet adapted to receive a first fluid stream comprising a solute dissolved in a solvent, (ii) optionally a second inlet zone (e.g., second thermalizer zone) in fluid communication with a second inlet adapted to receive a second fluid stream, (iii) a passive mixing zone having (A) a first mixing zone boundary and (B) a second mixing zone boundary separate from the first mixing zone boundary, the passive mixing zone being in fluid (direct) communication with the first inlet zone via the first mixing zone boundary and, when present, the second inlet zone via the first mixing zone boundary, (iv) a trap zone having a trap zone boundary in (direct) fluid communication with the second mixing zone boundary (e.g., where the trap zone boundary and the second mixing zone boundary are the same), wherein the trap zone is positioned within the microfluidic chamber such that fluid flowing through the microfluidic chamber has a sufficiently low velocity to retain solute crystals formed in the trap zone within the trap zone, (v) an outlet zone (e.g., one or more outlet zones such as one or more diffuser zones) in fluid communication (A) with the passive mixing zone via the first mixing zone boundary, and (B) an outlet adapted to discharge fluid from the microfluidic chamber, and (vi) optionally a first temperature control means for adjusting the temperature of the first fluid stream (when present) to a first pre-selected value before entering the passive mixing zone; wherein the microfluidic chamber comprises at least one of the second inlet zone and the first temperature control means.

In another aspect, the disclosure provides a method for screening crystalline polymorphs and morphology, the method comprising: (a) providing a microfluidic system according to any of its variously disclosed embodiments; (b) introducing a first fluid stream comprising a solute dissolved in a solvent at a first flow rate and a first temperature into the first inlet zone; (c) when the second inlet zone is present, introducing a second fluid stream at a second flow rate and a second temperature in the second inlet zone; and (d) adjusting at least one of the first flow rate, the first temperature, the second flow rate, and the second temperature to obtain a supersaturated state within the microfluidic chamber, thereby inducing crystallization and solute crystal formation in the trap zone.

BRIEF DESCRIPTION OF THE DRAWINGS

For a more complete understanding of the disclosure, reference should be made to the following detailed description and accompanying drawings wherein.

DETAILED DESCRIPTION

The disclosure relates to a microfluidic system suitable for screening of polymorphs, morphology, and crystallization kinetics under well-mixed, continuous-flow at controlled supersaturations. The disclosure also relates to a method for screening crystalline polymorphs and morphology using the disclosed microfluidic system. The disclosed microfluidic systems can be fabricated using additive technologies, such as 3D printing or stereolithography, which allows for the fabrication of complicated geometries of microchannels, while being cost and time effective.

The microfluidic system disclosed herein provides advantages compared to conventional batch screening systems and methods, including, for example, addressing issues of concentration gradients, diffusive mixing, and supersaturation depletion, each of which complicates screening of polymorphs and monitoring crystallization morphology and kinetics. The disclosed microfluidic system also makes it possible to track and trap solid phase materials for kinetic studies and characterization analyses under continuous-flow conditions. The disclosed microfluidic system provides a configuration suitable for cooling crystallizations, solvent/antisolvent crystallizations, or a combination thereof.

The disclosed microfluidic system includes a microfluidic chamber, an inlet zone, a passive mixing zone, a trap zone, an outlet zone, and optionally a temperature control means. The various zones of the microfluidic system are in fluid communication with each other and are configured in a manner to provide controlled supersaturation conditions, under continuous-flow such that crystalline materials are formed under these conditions and retained within the trap zone for study.

Figure 1:
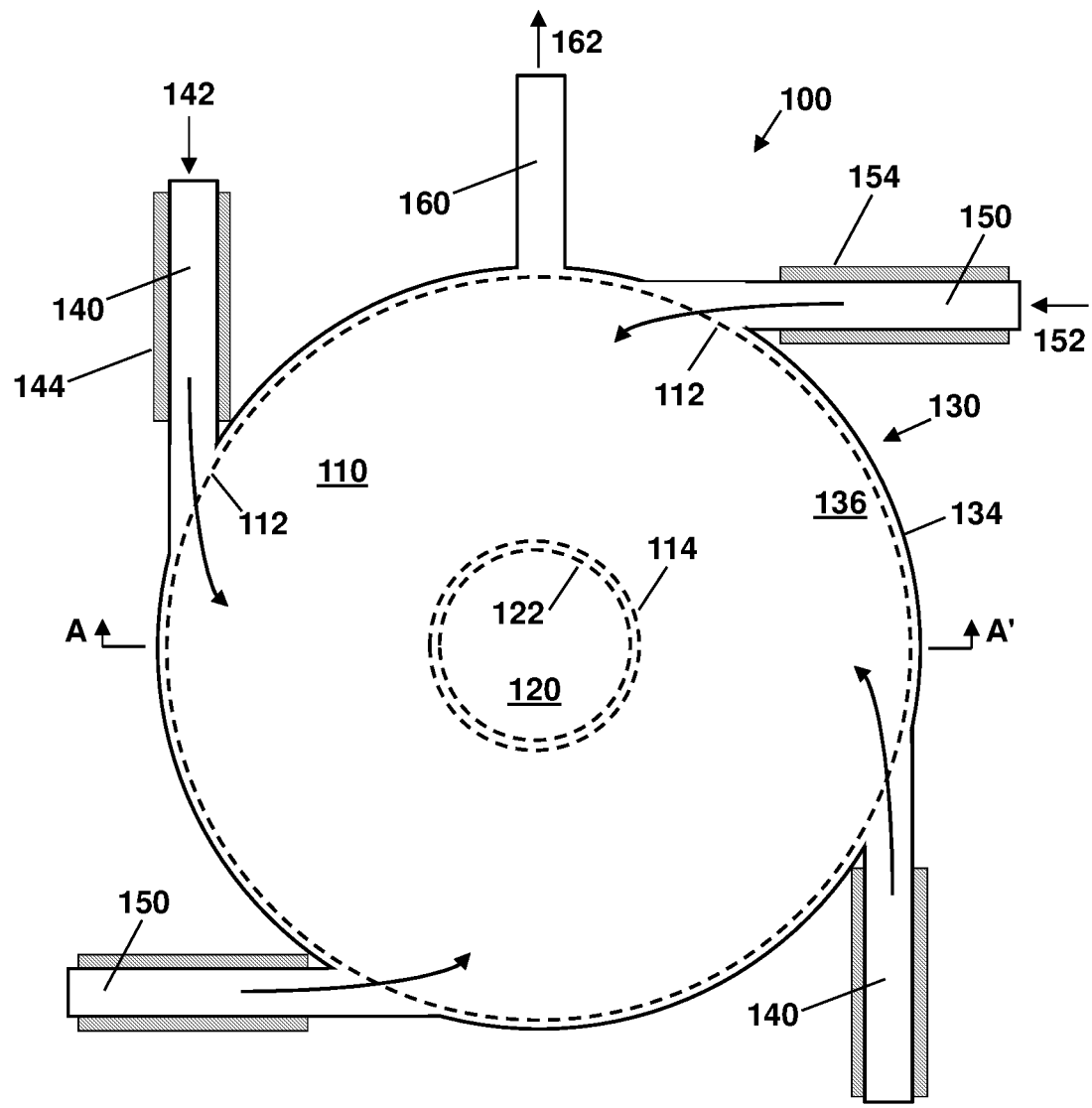
FIG. 1 illustrates a top view of a continuous-flow microfluidic chamber having a cyclone geometry in accordance with an embodiment of the disclosure.
Figure 2:
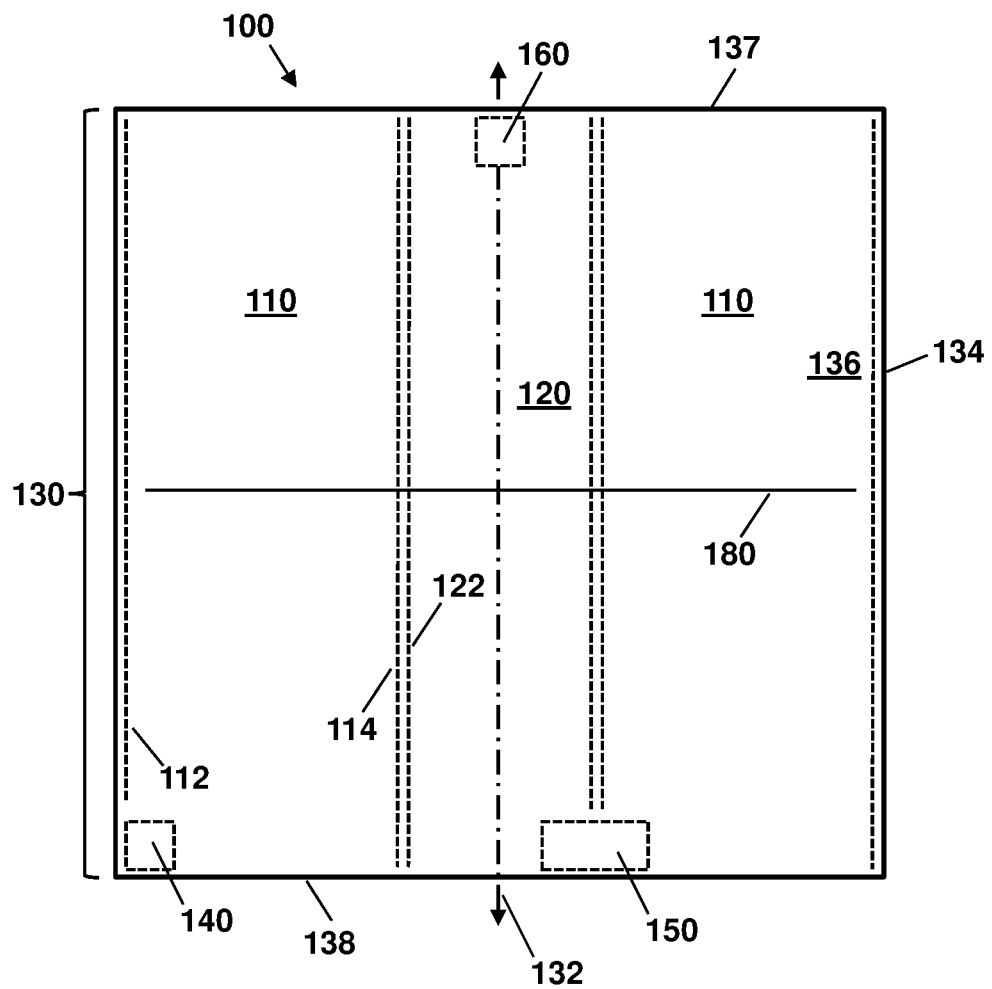
FIG. 2 illustrates a side cross-sectional view A-A' of the microfluidic chamber of FIG. 1.
Figure 3:
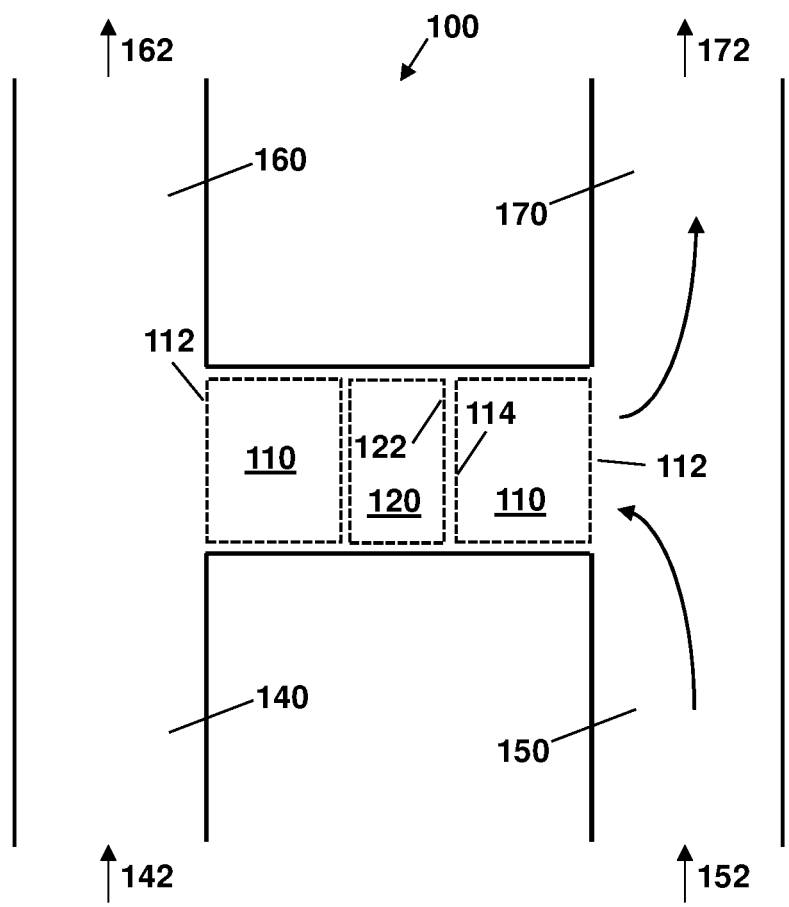
FIG. 3 illustrates a top view of a continuous-flow microfluidic chamber having an H-shaped geometry in accordance with an embodiment of the disclosure.

The disclosed microfluidic system can be configured in multiple geometries (e.g., H-shaped and cyclone mixers; various number of inlet/outlet zones) based on the desired parameters of the experiment and mode of crystallization (e.g., cooling and/or solvent/antisolvent). FIGS. 1 and 2, described in more detail below, illustrate a continuous-flow microfluidic chamber having a cyclone geometry in accordance with an embodiment of the disclosure. FIG. 3, described in more detail below, illustrates a continuous-flow microfluidic chamber having an H-shaped geometry in accordance with an embodiment of the disclosure.

Figure 4:
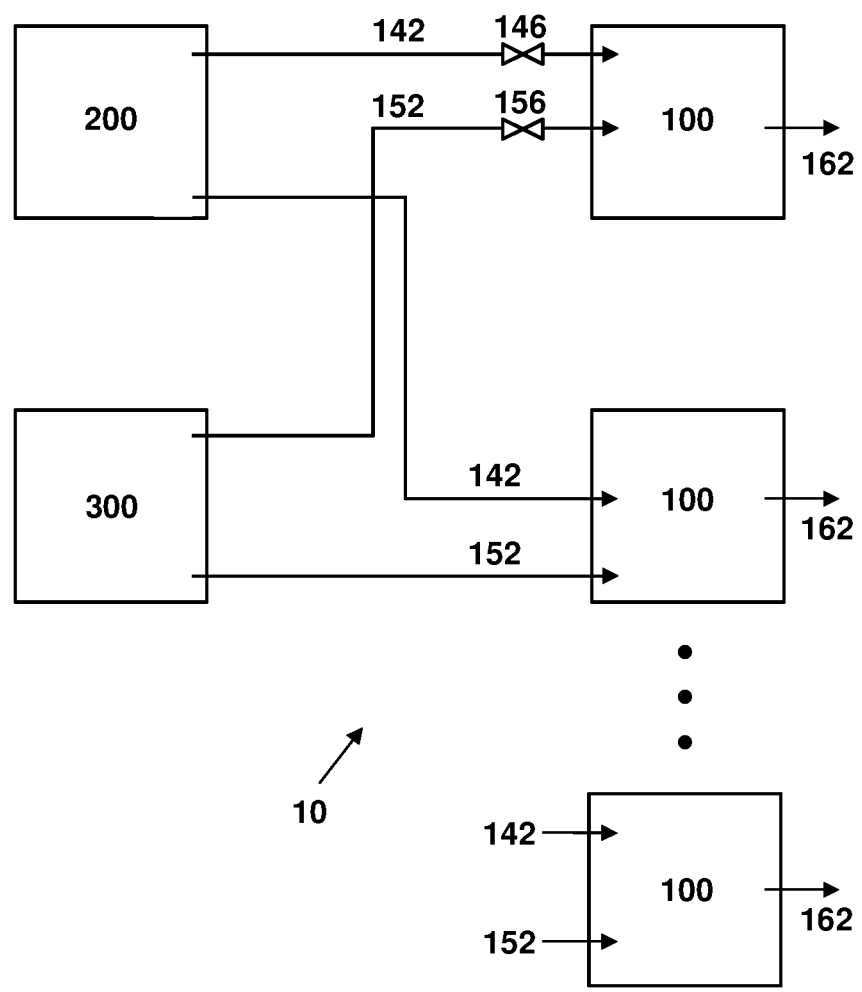
FIG. 4 illustrates a microfluidic system including fluid reservoirs and one or more microfluidic chambers according to the disclosure.

In some embodiments, the disclosed microfluidic system is configured to provide screening of multiple conditions (e.g., a multi-well high-throughput format) in a continuous-flow system, thereby addressing limitations of conventional batch screening systems, including heterogeneous conditions and diffusion-limited mixing. FIG. 4, described in more detail below, illustrates a microfluidic system including fluid reservoirs and one or more microfluidic chambers according to the disclosure, for example, where multiple microfluidic chambers as illustrated can be used to screen multiple crystallization conditions continuously and in parallel.

As used herein, the term "fluid communication" between two structures or regions refers to the ability of fluid (e.g., liquid and/or gas) to flow from one structure or region to the other, for example with or without passing through one or more intervening structures or regions. Direct fluid communication can reflect a spatial relationship in which fluid can flow from one structure or region to the other without passing through one or more intervening structures or regions. Indirect fluid communication can reflect a spatial relationship in which fluid can flow from one structure or region to the other by passing through at least one intervening structure or region. In some embodiments, fluid communication can be bidirectional (e.g., fluid can flow to/from either structure or region) or unidirectional (e.g., fluid can flow from one structure, either structure or region to the other, but not vice versa).

As used herein, the term "supersaturation" reflects a condition in which a solute (e.g., a component to be crystallized) is dissolved in a solvent at a concentration above the saturation condition of the solvent. A supersaturation degree or level (e.g., denoted by "S") can be expressed as a ratio of the actual concentration of the solute in a solvent relative to the saturation concentration of the solute in the solvent at specified conditions (e.g., temperature). The supersaturation degree or level is greater than 1, for example at least about 1.01, 1.02, 1.05, 1.1, 1.2, 1.3, 1.5, 2, or 3, and/or up to 1.5, 2, 3, 4, 5, 6, 8, or 10. A supersaturated state can be achieved, for example, by cooling a solution (e.g., saturated solution) of a solute, and/or by mixing an antisolvent with the solvent/solute mixture.

As generally illustrated in FIGS. 1-4, a microfluidic system 10 includes a microfluidic chamber 100, for example, with a solvent reservoir 200 and an antisolvent reservoir 300 each in fluid communication with one or more microfluidic chambers 100 (FIG. 4). FIGS. 1-3 illustrate further features of the microfluidic chamber 100, for example, in the form of a cyclone mixer (FIGS. 1-2) or an H-shaped mixer (FIG. 3). The microfluidic chamber 100 generally includes a body defining an internal volume 130 for mixing of inlet streams and inducement of crystallization under controlled, stable supersaturation levels.

The microfluidic chamber 100 further includes one or more inlets and one or more outlets to continuously feed and withdraw fluid from the chamber during crystal growth. For example, the chamber 100 includes one or more first inlet zones 140 in fluid communication with a first inlet 142, through which a first fluid stream is fed during operation. The first fluid stream generally includes a solute dissolved in a solvent, where the solute is to be crystallized under supersaturated conditions within the chamber 100. FIG. 1 illustrates a chamber 100 for a cyclonic mixer with two first inlet zones 140/first inlets 142, and FIG. 3 illustrates a chamber 100 for an H-shaped mixer with one first inlet zone 140/first inlet 142. In some embodiments, the chamber 100 can also include one or more second inlet zones 150 in fluid communication with a second inlet 152, through which a second fluid stream is fed during operation. The second fluid stream generally includes an antisolvent, which, when combined with the first stream under the well-mixed conditions of the chamber 100, reduces the solubility of the solute in the fluid medium and creates a supersaturated state to induce crystallization within the chamber 100. The chamber 100 also includes one or more outlet zones 160 in fluid communication with an outlet 162, through which the fluid medium within the internal volume 130 can be discharged during operation. FIG. 1 illustrates a chamber 100 for a cyclonic mixer with a single outlet zone 160/outlets 162, and FIG. 3 illustrates a chamber 100 for an H-shaped mixer with two outlet zones 160, 170/outlets 162, 172.

The internal volume 130 of the chamber 100 can include two zones or regions: a passive mixing zone 110 and a trap zone 120. The passive mixing zone 110 can be characterized by two boundaries, including a first mixing zone boundary 112 and a second mixing zone boundary 114 separate from the first mixing zone boundary 112. Likewise, the trap zone 120 can be characterized as a trap zone boundary 122. In some embodiments, the mixing zone boundaries 112, 114, and trap zone boundary 122 are not physical boundaries or otherwise a barrier to fluid flow, but rather they represent different regions within the internal volume 130 of the chamber 100 characterized by different fluid flow patterns. For example, the passive mixing zone 110 is generally the zone where inlet streams are introduced and mixed under sufficient fluid flow/velocity to provide a well-mixed supersaturated state. For example, the curved arrows in FIG. 1 illustrate tangentially fed first and second inlet streams that enter the passive mixing zone 110 and induce a rotational, swirling flow to promote mixing. As illustrated, the passive mixing zone 110 is in fluid communication (e.g., direct fluid communication) with the first inlet zone 140 via the first mixing zone boundary 112 and the second inlet zone 150 also via the first mixing zone boundary 112. Similarly, the outlet zone 160 is in fluid communication with the passive mixing zone 110 via the first mixing zone boundary 112. The trap zone 120 is generally the zone where fluid in the chamber 100, having already been well-mixed in the passive mixing zone to form the supersaturated state, has a locally small fluid velocity such that solute crystals forming in the trap zone 120 tend to remain in the trap zone 120 so that they can be evaluated both during growth and after completion of an experiment. As illustrated, the trap zone boundary 122 is in fluid communication (e.g., direct fluid communication) with the second mixing zone boundary 114. The boundaries 114 and 122 are illustrated with a small separation distance for clarity, although the two boundaries can be at the same location in some embodiments (e.g., with direct fluid communication between the passive mixing zone 110 and the trap zone 120). In some embodiments, one or more of the the mixing zone boundary 112, the mixing zone boundary 114, and/or the trap zone boundary 122 can be a physical boundary, for example when a membrane 180 is incorporated into the internal volume 130 of the chamber 100.

In some embodiments and as illustrated in FIG. 1, the microfluidic chamber 100 can include one or more temperature control means for adjusting the temperature of the inlet streams to pre-selected values before entering the passive mixing zone 110. As particularly shown in FIG. 1, the first inlet zone 140 can include a first temperature control means 144 to adjust the temperature of the first inlet stream, and the second inlet zone 150 can include a second temperature control means 154 to adjust the temperature of the first inlet stream. The temperature control means are not particularly limited and generally can include any suitable cooling apparatus, for example, a cooling jacket around the channel structure defining the inlet zones 140, 150. The temperature control means can be included when it is desired to induce supersaturation and crystallization by cooling an inlet solute stream below its saturation temperature. In embodiments, where supersaturation and crystallization are induced by mixing an inlet solute stream with an antisolvent, the temperature control means can be either included (e.g., using cooling and antisolvent mixing) or omitted (e.g., using only antisolvent mixing).

Microfluidic Chamber

The microfluidic system 10 includes at least one microfluidic chamber 100. The microfluidic chamber 100 generally has an outer wall or other structural body that defines an internal volume 130 for mixing of inlet streams and inducement of crystallization under controlled, stable supersaturation levels. In one embodiment and as illustrated in FIGS. 1-2 corresponding to a cyclone mixer, the internal volume 130 generally has a central axis 132, a circular cross-section 134, and an outer circumferential portion 136 of the cross-section 134. The circular cross-section 134 can have a uniform/constant-radius circular cross-section for a cylindrical body, a variable-radius circular cross-section for a conical or other sloped-wall body, or a combination of shapes. The central axis 132 generally corresponds to the axial direction in a cylindrical coordinate system defined by the cylindrical and/or conical body of the internal volume 130, and it similarly corresponds to the rotational axis for swirling flow within the internal volume 130.

Each of the microfluidic chambers has at least one inlet and at least one outlet. As described herein, the inlets and outlets of multiple microfluidic chambers are selectively connectable to vary the supersaturation, as described herein, in each chamber or compartment of the system to facilitate high throughput screening.

The microfluidic system can include any suitable number of microfluidic chambers, depending on the desired configuration of the system. In some embodiments, the microfluidic system has one microfluidic chamber. In other embodiments, the microfluidic system has more than one microfluidic chamber, for example, 2, 3, 4, 5, 6, 7, 8, 9, 10, or more microfluidic chambers. As particularly illustrated in FIG. 4, the microfluidic system 10 can include a plurality of microfluidic chambers 100, for example, operating in parallel and being in fluid communication with a solute/solvent reservoir 200 and (optionally) an antisolvent reservoir 300 (e.g., when using an antisolvent to induce crystallization).

In some embodiments, the microfluidic system includes a plurality of microfluidic chambers, wherein the inlets and outlet(s) of each microfluidic chamber are adapted to be selectively operated at controlled conditions (e.g., temperature, flow rate, solute concentration) to vary the supersaturation in each microfluidic chamber to facilitate high throughput screening of crystal formation under different conditions.

Inlet Zone

The microfluidic chamber of the disclosed system includes at least one inlet zone (e.g., inlet channel). The inlet zone is in fluid communication with an inlet adapted to receive an inlet stream comprising a solute, a solvent, an antisolvent, an additive, or any combination thereof. An inlet zone in fluid communication with an inlet adapted to receive an inlet stream is referred to as an "inlet channel". The inlets are desirably connected to the microfluidic chamber using one-way microfluidic check valves (e.g., a Luer-lock type fitting) to prevent backflow inside channels for the inlet streams, for example as illustrated by check valves 146, 156 in FIG. 4 for the corresponding inlets 142, 152, respectively.

The microfluidic chamber of the system can include more than one inlet zone (e.g., 2, 3, 4, 5, 6, 7, 8, 9, 10, or more inlet zones) depending on the desired configuration. The maximum number of inlet zones is not particularly limited except for other than cost, size, space, operational complexity, physical limitations, etc. In some embodiments, the total number of inlet zones for fluid flowing into the microfluidic chamber is an even number, for example when the inlets include corresponding pairs of (i) a solvent/solute inlet and (ii) an antisolvent inlet.

In some embodiments, the microfluidic chamber includes two inlet zones. In other embodiments, the microfluidic chamber includes three inlet zones. In yet other embodiments, the microfluidic chamber includes four inlet zones. In still yet other embodiments, the microfluidic chamber includes five inlet zones. In other embodiments, the microfluidic chamber includes six inlet zones, seven inlet zones, or eight inlet zones.

The inlet zone(s) are adapted to receive an inlet stream(s), such that the first inlet zone is in fluid communication with a first inlet adapted to receive a first fluid stream. Moreover, when more than one inlet zone is present, the first inlet zone is in fluid communication with a first inlet adapted to receive a first fluid stream and the second inlet zone is in fluid communication with a second inlet adapted to receive a second fluid stream. Similarly, when three inlet zones are present, the third inlet zone is in fluid communication with a third inlet adapted to receive a third fluid stream, and when four inlet zones are present, the fourth inlet zone is in fluid communication with a fourth inlet adapted to receive a fourth fluid stream, etc.

The inlet zone(s) can have any suitable configuration in relation to the microfluidic chamber, provided that the inlet zone(s) provide suitable flow rates, flow pressures of inlet fluid streams.

When more than one inlet stream is present, it is desirable that there be a minimal pressure difference between the fluid pressures of the inlet streams (e.g., fluid pressures of the inlet streams are substantially identical). The existence of a pressure difference between the pressure profile of the inlet streams into the mixing zone (e.g., cylindrical zone) results in the change of flowrate ratios and consequently affect the supersaturation ratio. The fluid pressures can be simulated using, for example, multi-physics simulations using COMSOL MULTIPHYSICS to calculate the pressure profile in each inlet stream/route.

In some embodiments, the plurality of first inlet zones are circumferentially distributed around (e.g., at substantially equally distributed angular locations) and tangentially aligned relative to the internal volume of the microfluidic chamber, for example when the chamber corresponds to a cyclone mixer such as illustrated in FIG. 1.

In some embodiments, the plurality of first inlet zones and the plurality of second inlet zones are circumferentially distributed around (e.g., at substantially equally distributed angular locations) and tangentially aligned relative to the internal volume of the microfluidic chamber, for example when the chamber corresponds to a cyclone mixer such as illustrated in FIG. 1. In such embodiments, the first and second inlet zones can be alternated around the circumference of the chamber (e.g., first inlet-second inlet-first inlet-second inlet as shown in FIG. 1), which in turn promotes mixing of the first and second inlet streams after entering the passive mixing zone.

In some embodiments having more than one inlet zone, the inlet zones are configured to essentially be parallel to one another, wherein the inlet zones are connected by a third channel corresponding to the mixing zone and trap zone. This configuration is referred to as the H-shaped geometry, for example, as illustrated in FIG. 3. Here, the passive mixing zone, as illustrated, includes two distinct regions 110, separated by the trap zone having a single region 120. The zones are qualitatively illustrated as having rectangular shapes, but more generally have other irregular shapes where local velocity profiles promote mixing (mixing zone 110) or crystal retention (trap zone 120).

In some embodiments having more than one inlet zone, the inlet zones are positioned at an outer circumferential portion of the internal volume of the microfluidic chamber (e.g., at the outer wall/boundary of the internal volume, which can correspond to the first mixing zone boundary). This configuration is referred to as the cyclone shaped geometry, for example, as illustrated in FIGS. 1-2. Here, the passive mixing zone as illustrated includes an annular region 110, with the trap zone having a single region 120 along the axis 132. The zones are qualitatively illustrated as having circular shapes (e.g., annular and cylindrical), but more generally have other irregular shapes where local velocity profiles promote mixing (mixing zone 110) or crystal retention (trap zone 120). The trap zone 120 near the rotation/swirling axis in a cyclone mixer is particularly suitable for crystal formation and retention, because the radial and tangential velocities of an axisymmetric swirling flow, such as in a laminar cyclone mixer, approach zero at the central axis 132.

In some embodiments, the number of equally spaced inlets determines the angle between the inlets such that the inlet streams are tangentially arranged around the circumference of the microfluidic chamber. For example, a cyclone shaped system may have 2 inlets equally space around a cylindrical microfluidic chamber (e.g., 180 degrees apart). Similarly, if the cyclone shaped system has 4 inlet streams, then they would be equally spaced at 90 degrees apart (e.g., as shown in FIG. 1); if the cyclone shaped system has 8 inlet streams, then they would be equally spaced at 45 degrees apart, etc.

In some embodiments having the cyclone-shaped geometry, the arrangement of the inlet zones also can be configured to have a merged-inlet geometry, to reduce the number of inlets, as well as the size, making this configuration/geometry amenable to a multi-well format.

Figure 5:
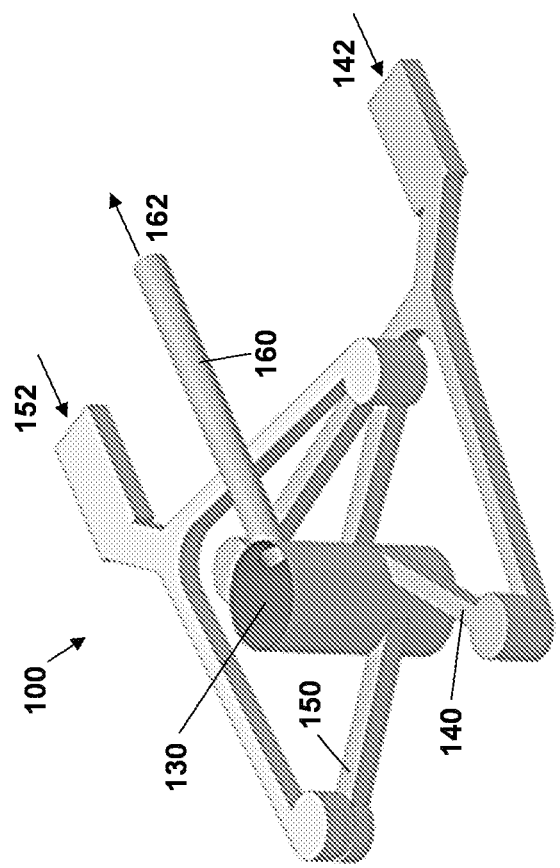
FIG. 5 illustrates a top view (left) and a perspective view (right) of a continuous-flow microfluidic chamber having a cyclone geometry with four inlets and one outlet configured with a merged inlet geometry.
Figure 5:
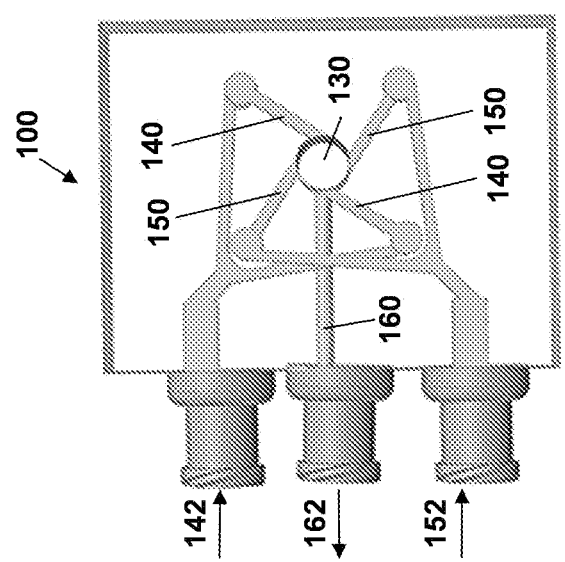

By way of illustration, while keeping the tangential inlets into the mixing chamber, each two non-neighbor inlets are connected through a Y-junction and then merged into a single main inlet on one side. Connecting non-neighboring inlets requires a modification in the z-axis for two pairs to avoid their intersection. The route for both inlets should be exactly identical to maintain identical pressure profiles in all of the inlet routes. A representative single microfluidic mixer with four inlets and having this merged inlet geometry is shown in FIG. 5. As shown, a single first inlet 142 is split at a Y-junction into two corresponding first inlet zones 140 having substantially the same fluid path lengths before entering the internal volume 130 of the mixing chamber 100. Similarly, a single second inlet 152 is split at a Y-junction into two corresponding second inlet zones 150 having substantially the same fluid path lengths before entering the internal volume 130 of the mixing chamber 100. Suitably, the second inlet zones 150 also have the same fluid path lengths as the first inlet zones 140 (e.g., path lengths within 1, 2, 5, or 10% of each other), thereby maintaining substantially identical pressure profiles in the inlet streams.

In some embodiments, the inlet zone functions as a thermalizer zone, wherein the thermalizer zone regulates the temperature of a fluid stream to a desired temperature. The thermalizer zone provides a means for entering streams to attain a constant, pre-selected temperature and desired supersaturation state for cooling crystallization. As shown in FIG. 1, a thermalizer zone can be in the form an inlet zone 140, 150 with an associated temperature control means 144, 154.

When present, the microfluidic system can include any suitable number of thermalizer zones. The maximum number of thermalizer zones is not particularly limiting. In various embodiments, the number of thermalizer zones is suitably less than or equal to the number of inlets.

In embodiments of the disclosed system having only one inlet zone, that is, embodiments using cooling crystallization, the first inlet zone includes a first thermalizer zone.

The temperature of the thermalizer zone is maintained at a constant temperature, for example, using an external thermoelectric system (e.g., temperature control means). In some embodiments, including cooling crystallization, the solution including solute entering the microfluidic device cools as it flows through the thermalizer zone.

The temperature of the thermalizer zone is controlled using any suitable temperature control means, for example, a cooling jacket or other external cooling device around the inlet zones, which cool the inlet fluid streams to achieve a desired temperature, thereby achieving a desired level of supersaturation within the microfluidic chamber, which in turn provides a controlled condition for crystal formation.

In some embodiments, the microfluidic system includes a first temperature control means for adjusting the temperature of the first fluid stream (when present) to a first pre-selected value before entering the passive mixing zone.

The thermalizer zone can have any suitable length provided that the length is sufficient for the entering solution (e.g., about 99 vol % of the solution) to achieve the desired temperature. If the critical length is too short, the fluid streams may not obtain the desired temperature. In contrast, if the critical length is too long, the configuration of the microfluidic system may be overly large or operate at reduced efficiencies. The length of the thermalizer zone sufficient to achieve the desired temperature, sometimes referred to as the "critical length", will depend on the particular configuration and parameters of the microfluidic system (e.g., flow rates, pressure, temperature gradients/profile, solubilities, etc.).

Passive Mixing Zone

The microfluidic chamber of the disclosed system includes at least one passive mixing zone. As described herein, the passive mixing zone is in fluid communication with both the inlet zone and outlet zone, as well as the trap zone. The passive mixing zone has a first mixing zone boundary and a second mixing zone boundary separate from the first mixing zone boundary. The passive mixing zone is in fluid communication with the first inlet zone via the first mixing zone boundary and in fluid communication with the second inlet zone (when present) via the first mixing zone boundary. The passive mixing zone also is in fluid communication with the outlet zone via the first mixing zone boundary. The second mixing zone boundary of the passive mixing zone is in fluid communication with the trap zone.

It is desirable that the passive mixing zone does not include substantial mechanical, convective and/or external mixing that interferes with the crystallization process, for example, mixing with magnetic or other stirrers in the internal volume of the mixer.

In some embodiments, the passive mixing zone is positioned within an outer circumferential portion of the internal volume of the microfluidic chamber.

The passive mixing zone facilitates mixing of the inlet fluid stream(s) to provide a desired supersaturation condition (e.g., desired supersaturation ratio) of the solute. For example, in an embodiment, the passive mixing zone facilitates mixing of solute solution and antisolvent to create a supersaturated environment for antisolvent crystallization. In other embodiments wherein crystallization is facilitated by cooling, the passive mixing zone, in fluid communication with a thermalizer zone present in the inlet zone, follows (e.g., downstream) the thermalizer zone and provides the desired supersaturation conditions. Because of the passive mixing zone, the supersaturated environment suitably has a degree of supersaturation that is substantially homogeneous throughout the internal volume of the mixer and substantially consistent over time during crystallization. In various embodiments, during crystallization, at least about 30, 40, 50, 60, or 70% and/or up to about 50, 60, 70, 80, 90, or 100% of the internal volume of the mixer is substantially well-mixed, for example having a local solute concentration within 1, 2, or 5% of its well-mixed reference concentration. A well-mixed concentration reference concentration corresponds to the average or perfectly mixed solute concentration resulting from the combination of all inlet streams combined. In other embodiments, during crystallization, at least about 60, 70, 80, or 90 and/or up to about 70, 80, 90, or 100% of the internal volume of the mixer is within 50% of its well-mixed reference concentration. In other embodiments, during crystallization, at least about 40, 50, 60, or 70 and/or up to about 60, 70, 80, 90, or 100% of the internal volume of the mixer is within 25% of its well-mixed reference concentration.

In addition to or as an alternative to the foregoing characterization of spatial homogeneity throughout the internal volume of the mixer, the internal volume of the mixer similarly can be characterized in terms of its temporal stability and consistency for supersaturation. The disclosed microfluidic chambers typically have relatively short transient periods during startup of a crystallization experiment, when fluid streams are first fed into the chamber and local concentrations/degrees of supersaturation increase or otherwise change until they reach a steady value. For common inlet flow rates, such startup transient times can be at least about 0.1, 0.2, 0.5, 1, 2, 5, 10, 20, or 30 seconds and/or up to about 1, 2, 5, 10, 20, 30, 40, 60, 90, or 120 seconds. In some cases, it is desirable to have relatively low startup transients, for example when a give solute rapidly crystallizes. In such cases, the ability of the disclosed microfluidic chambers to rapidly achieve a steady fluid dynamic state means that the crystals will form/grow under consistent conditions throughout a given experiment. When desired to reduce the startup transient for a given system, the inlet flow rates can be adjusted to be initially high, thereby decreasing the time to the steady fluid dynamic state, and then reduced to a level that maintains the steady, well-mixed state over time, for example with an initial pulse inlet flow, a high-to-low step change or ramped inlet flow rate profile, etc. At the steady fluid dynamic state, the local concentration of solute and/or local degree of supersaturation remains steady over time at a given location (e.g., in the trap zone, in the passive mixing zone, etc.), for example remaining within about 1, 2, 5, 7, 10, or 15% of its initial steady or maximum value during a crystallization experiment. Put another way, once a location reaches reaches a particular solute concentration or supersaturation degree after its startup transient, the location tends to remain at or near the particular solute concentration or supersaturation without substantially increasing or decreasing during the experiment, which in turn maintains consistent crystal growth conditions for evaluation.

In some embodiments, the passive mixing zone is configured to provide counter diffusion mixing, rotational mixing, oscillatory flow, or a combination thereof.

In some embodiments, the passive mixing zone is configured to provide counter diffusion mixing of the inlet streams to provide a desired supersaturation state. Counter diffusion mixing can be effected in an H-shaped microfluidic chamber such as in FIG. 3. The curved arrows qualitatively illustrate streamlines of fluid passing from inlet zones 140, 150 into the passive mixing regions 110, and out of the passive mixing zone 110 to the outlet zones 160, 170. Fluid in the passive mixing zone 110 meets in the middle trap zone 120, where crystals form and remain substantially in place due to the low velocity in the trap zone 120. Fluids in the inlet zones 140, 150 can be solvent/solute and antisolvent streams, respectively, or cooling can be used to effect cooling crystallization.

Counter-diffusion crystallization can be used to grow crystals of macromolecules that have longer induction time and slower growth kinetics. However, conventional devices relying on counter-diffusive mixing not only suffer from stable concentration gradients causing supersaturation to vary across the length of the mixer, but also a longer time scale for the diffusion of the solute. These issues can result in inaccuracies when screening polymorphs and morphology. In contrast to these conventional devices, the passive mixing zone of the disclosed microfluidic system provides constant, controlled supersaturation conditions.

In some embodiments, the passive mixing zone is configured to provide the rotational mixing of the inlet streams to provide a desired supersaturation state. Rotational mixing can be effected in a cyclone microfluidic chamber such as in FIGS. 1-2. The curved arrows qualitatively illustrate streamlines of fluid passing from inlet zones 140, 150 into the passive mixing regions 110, and out of the passive mixing zone 110 to the outlet zone 160. Fluid in the passive mixing zone 110 also travels to the central trap zone 120, where crystals form and remain substantially in place due to the low velocity in the trap zone 120. Fluids in the inlet zones 140, 150 can be solvent/solute and antisolvent streams, respectively. In some embodiments, only first inlet zones 140 with solvent/solute streams are present, and the inlet zones 140 further include temperature control means 144 to cool the inlet streams and effect cooling crystallization.

For a cyclone mixer of fixed height, the intensity of mixing will increase with increasing velocity and decreasing radius of the mixer. The number of inlets and their diameters determine the minimum radius of the mixer. The dimensions of the cyclone mixer are not particularly limited. A general cyclone mixer can be characterized in terms of the axial height H of the mixing chamber/internal volume, the diameter $D1$ of the mixing chamber/internal volume (or maximum diameter for a variable-diameter chamber), and/or the diameter $D2$ of the inlet and/or outlet orifices (e.g., diameter of a circular orifice, hydraulic diameter of a non-circular orifice). In various embodiments, the ratio $H/D2$ can be at least 1, 2, 3, 4, 5, or 6 and/or up to 6, 7, 8, 9, 10, or 12, for example in a range of 1-12, 3-10, or 5-7. In various embodiments, the ratio $D1/D2$ can be at least 1, 2, 3, 4, 5, or 6 and/or up to 6, 7, 8, 9, 10, or 12, for example in a range of 1-12, 3-10, or 5-7. In various embodiments, $D2$ can be at least 10, 20, 50, 100, or 200 μm and/or up to 200, 300, 500, 700, 1000, or 1500 μm, for example in a range of 100-1000 μm.

In some embodiments, the passive mixing zone is configured to provide oscillatory flow mixing of the inlet streams to provide a desired supersaturation state. In oscillatory flow, fluid streams are reversibly fed into the internal volume 130 via the inlet zones 140, 150, and then withdrawn from the internal volume 130 via the inlet zones 140, 150 in cyclic succession. Fluid correspondingly exits and enters via the outlet zone 160 during the oscillatory cycles. Such cycles create mixing within the internal volume 130, for example, swirling flows with the forward and reverse flows.

It is desirable to attain the desired supersaturation conditions near the entrance of the outlet zone. This ensures achieving target supersaturation followed by the onset of crystallization before the solute solution (e.g., inlet stream) enters the outlet zone.

Trap Zone

The microfluidic system includes at least one trap zone. The trap zone facilitates the crystallization of the solute by providing a stagnant zone such that crystal particles formed therein are not carried out of the trap zone by the flowing fluid. Accordingly, the trap zone is positioned within the microfluidic chamber such that fluid flowing through the microfluidic chamber has a sufficiently low velocity to retain solute crystals formed in the trap zone within the trap zone. It is desirable that local fluid velocities within the trap zone boundary are near zero, thereby allowing for crystals to nucleate and grow at a fixed place surrounded by a constant supersaturated environment.

The trap zone has a trap zone boundary in fluid communication with the second mixing zone boundary.

In some embodiments, the trap zone boundary and the second mixing zone boundary are the same.

In some embodiments, the trap zone is positioned at an inner axial portion of the internal volume of the microfluidic chamber (e.g., along the central axis, with the trap zone boundary/second mixing zone boundary being the interface between the passive mixing zone and the trap zone).

In some embodiments, the trap zone of the microfluidic system is not in direct fluid communication with the outlet zone. It is desirable for the trap zone to be isolated or otherwise separated from the outlet zone. For example, the trap zone can be completely surrounded by/contained within the passive mixing zone, thus maximizing the amount of crystals that are retained in the trap zone and preventing their loss via the outlet zone.

Fluid flowing through the trap zone has a sufficiently low Stokes number. The Stokes number reflects the ratio of a characteristic time for particle motion (e.g., formed crystal particles) to a characteristic time for fluid motion. If the Stokes number is too high, then the trap zone will be unable to retain crystals that are formed. When the Stokes number is sufficiently low, the crystals formed in the microfluidic chamber will follow fluid streamlines and be well mixed in the bulk of the fluid, which is generally characterized by laminar flow. For example, it is desirable that the Stokes number (e.g., during operation of the apparatus) in the trap zone is substantially less than one. For example, the Stokes number can be as low as zero (e.g., in an H-shaped mixer) and/or up to values of 0.001, 0.01, or 0.1 (e.g., in a cyclone mixer).

In an aspect, crystals grown in the disclosed system (e.g., H-shaped and cyclone-shaped geometries), are confined and retained in the trap zone, as described herein. A low Stokes number for the H-shaped (Stk=0) and cyclone mixer (e.g., Stk=$5.5 \times 10^{-3}$ in a representative embodiment) confirm that crystals are dispersed in the fluid.

Outlet Zone

The microfluidic system includes at least one outlet zone. The outlet zone is in fluid communication (A) with the passive mixing zone via the first mixing zone boundary, and (B) an outlet adapted to discharge fluid (e.g., mother liquor) from the microfluidic chamber, as described herein.

The outlet zone facilitates the discharge of fluid from the microfluidic chamber. For example, in an embodiment, the outlet zone facilitates the mixing of solution and antisolvent to create a supersaturated environment for antisolvent crystallization.

In some embodiments, the outlet zone comprises a diffuser zone.

In some embodiments, the outlet zone(s) is positioned at an outer circumferential portion of the internal volume of the microfluidic chamber.

In some embodiments, the cyclone-shaped mixer has 4 inlets, as described herein, and 1 outlet on the top.

Other Features

In some embodiments, for example, as illustrated in FIG. 4, the microfluidic system 10 further includes a solvent reservoir 200 in fluid communication with the first inlet zone 140 via the first inlet 142. The solvent reservoir 200 contains therein the solute dissolved in the solvent. The solvent/solute mixture therein can be continuously delivered to one or more microfluidic chambers 100 via the first inlets 142. In some embodiments, the microfluidic system 10 further includes an antisolvent reservoir 300 in fluid communication with the second inlet zone 150 via the second inlet 150. The antisolvent reservoir 300 contains therein the antisolvent. The antisolvent therein can be continuously delivered to one or more microfluidic chambers 100 via the second inlets 152.

The disclosed microfluidic system 10 can include any suitable number of reservoirs. For example, the system 10 can include one solvent reservoir 200, or multiple solvent reservoirs 200 with the same or different solvent/solute mixtures (e.g., at different concentrations) therein. Similarly, the system 10 can include one antisolvent reservoir 300, or multiple antisolvent reservoirs 300 with the same or different antisolvent mixtures (e.g., different antisolvent and/or different additives therein) therein.

Viewing Port

In some embodiments, the microfluidic chamber has an open bottom and top surfaces for post-screening analysis of crystals, or to insert sensors to monitor screening, or to include patterned surface to assist in secondary nucleation. The open surfaces can be covered using any suitable covering. For example, as illustrated in FIGS. 2 and 5, the internal volume 130 of the microfluidic chamber 100 as provided can have an open bottom and top surfaces (FIG. 2), which open surfaces can be covered with a top cover 137 and a bottom cover 138 (FIG. 5). The top and bottom covers 137, 138 provide a seal to the internal volume 130 so that fluid only enters/exits via the inlets 140, 150 and outlet(s) 160. The top and bottom covers 137, 138 further can be formed to provide a particular function to assist in crystallization and/or monitoring. For example, one or both of the covers 137, 138 can be formed from a transparent material to facilitate optical interrogation of crystal growth in the chamber 100 from an external location. Similarly, one or both of the covers 137, 138 can be adapted to be removed to facilitate the removal of grown crystals after an experimental, for example, to allow polymorphic analysis of the crystals. Additionally, one or both of the covers 137, 138 can include a patterned surface to promote crystal growth via nucleation.

Illustrative suitable coverings include polycarbonate films or layers, other transparent thermoplastic materials such as poly(methyl methacrylate), a double-sided (transparent) reversible adhesive tape, and a glass cover-slip for maximum transparency for optical microscopy. A photopolymer resin (of suitable optical transparency) can be used to seal the polycarbonate film/cover-slip to both top and bottom surfaces, followed by curing using ultraviolet light. It is desirable that the photopolymer is compatible with the solvent used for screening. Solvent-compatible epoxy resin is also suitable for adhering a covering (e.g., cover slip) to the device. To harvest crystal for post-screening analysis, the polycarbonate film/cover-slip can be detached using a scalpel.

Optical Fiber Sensors

In some embodiments, the microfluidic system further includes a sensor for detecting one or parameters of the microfluidic system, for example, one or more of solute concentration, a fluid stream temperature, and a fluid stream flow rate. For example, the microfluidic device can include optical fibers for measuring crystal size distribution, shape distribution, velocity, temperature, the concentration of solute, and polymorph. Such measurements can be made as a function of time to characterize the time-dependent growth properties of the crystals. These measurements typically require different types of sensors connected to the mixer using optical fibers.

Illustrative suitable examples of these sensors for various measurements are (a) crystal size and shape measurement—Focused-beam reflectance measurement (FBRM), Particle Vision measurement (PVM). (b) solute concentration—electrochemical sensor, or attenuated total reflectance-FTIR, (c) crystal polymorph—Raman spectrometer or x-ray diffractometer.

Patterned Surface

In some embodiments, the microfluidic chamber of the system includes a patterned surface adapted to promote the nucleation of crystals. When present, the patterned surface can be located on any suitable interior surface in the microfluidic chamber. For example, the patterned surface can be located on all or a portion of an interior sidewall, bottom surface, top surface, etc. of the microfluidic chamber. The patterned surface can be attached to the bottom of the passive mixing zone. The patterned surface can be either 3D printed or fabricated using lithography. Without wishing to be bound to any particular theory, the patterned surface promotes nucleation of crystals by increasing the average surface roughness. The surface roughness of such patterned surfaces suitably can range from about 1.1 to 5.5. for example being at least about 1.1, 1.2, 1.3, 1.5, 1.7, or 2 and/or up to about 1.5, 2, 2.5, 3, 3.5, 4, 4.5, 5, or 5.5.

Figure 6:
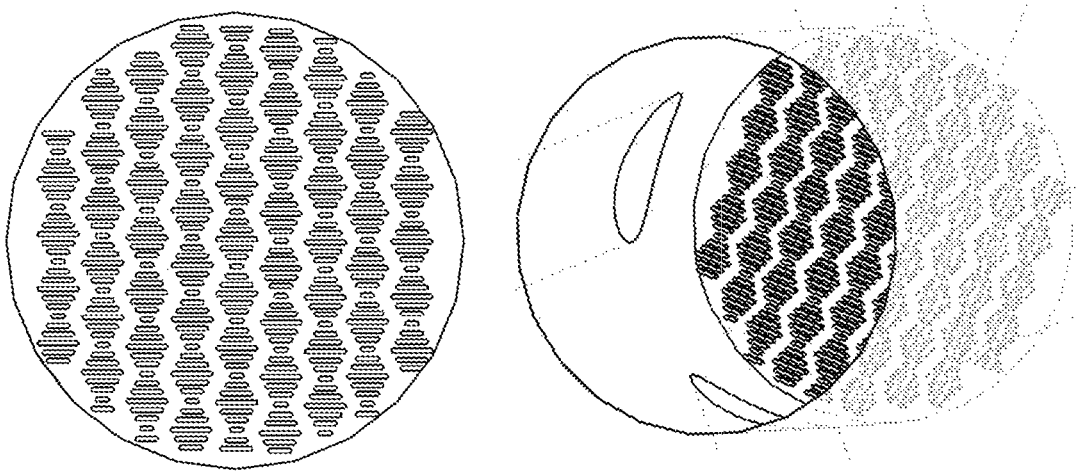
FIG. 6 illustrates exemplary patterned surfaces that can be attached to an inner surface of the microfluidic chamber.
Figure 6:
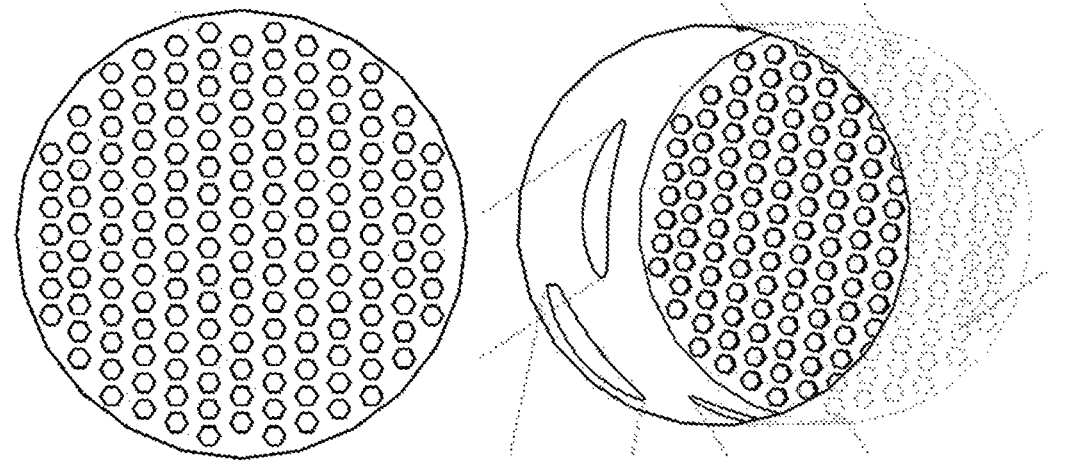
Figure 6:
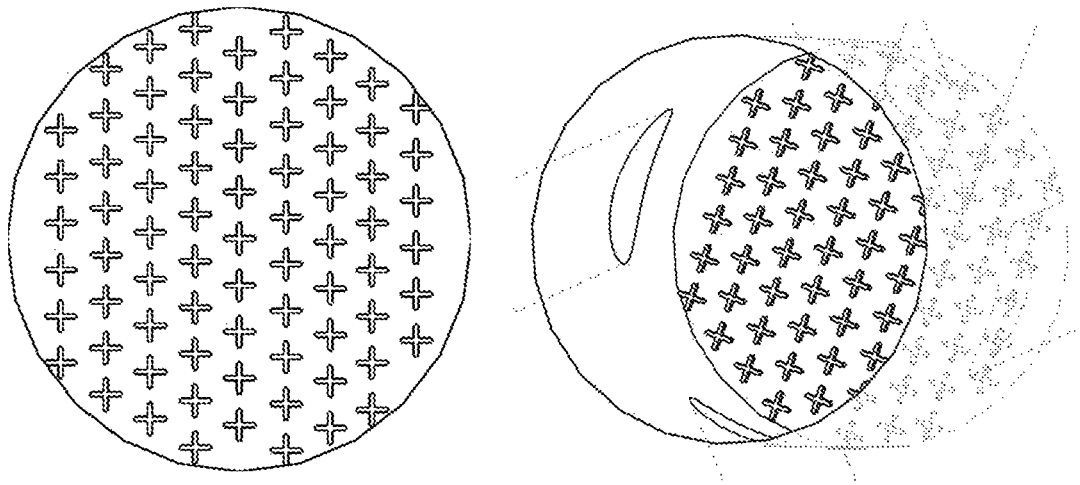

When present, the patterned surface(s) can be attached to the bottom opening of the well to facilitate faster nucleation and lower induction time. Using different patterns integrated with the continuous microfluidic device, the effect of the patterned surfaces on the kinetics of crystallization can be screened. Some examples of patterned surfaces are shown in FIG. 6. The patterns suitably can include regular geometric shapes, such as rectangular, triangular, hexagonal, cross, line, etc. shapes. Typical dimensions for pattern units (e.g., length, width, and/or diameter) can be at least 1, 2, 3, 5, or 10 μm and/or up to 5, 10, 15, 20, or 30 μm.

Microtiter Insert

In some embodiments, the microfluidic chamber of the system is sized and shaped to provide a microtiter plate insert. For example, the microfluidic chamber can have a generally cylindrical body that is adapted to be inserted into a microtiter well. The microfluidic chamber body further includes inlets that correspond to the feed lines of the microtiter plate that feed the desired solvent, solute, and antisolvent to the microtiter well at controlled, desired flowrates. For example, the wells have an inner diameter of 10 mm and an outer diameter of 14 mm. The channels are on the top portion with a width of 1 mm that are entering into the well from a cylindrical channel on the top. The microtiter plate insert with inlets and outlets for each well is 3D printed to enable existing microtiter plates to screen polymorphs at controlled supersaturation.

Membrane

In some embodiments, the microfluidic chamber of the system further includes a membrane positioned between (A) the outlet zone and (B) the first inlet zone and the second inlet zone (when present). The membrane is generally positioned in the interior of the microfluidic chamber, for example, spanning or otherwise within the passive mixing zone and/or the trap zone, thus separating the one or more inlet zones from the one or more outlet zones.

In some embodiments, the membrane is present and is positioned on the boundary of the passive mixing zone.

The membrane integration or filtration setup as a layer right before inlet is especially useful for crystalline materials with smaller sizes. Particles will be retained within the mixing zone used for future analysis.

As shown in FIG. 2, a membrane 180 can be included within the internal volume 130 of the chamber 100. The membrane 180 is positioned so that it spans the passive mixing zone 110 and trap zone 120 at a location between the inlets 140, 150, and the outlet 160. Such placement of the membrane 180 can help to retain formed crystals within chamber 100 for evaluation. A clear membrane of varying porosity (e.g., less than 1 μm) can be included in the center of the well to trap slow-growing crystals to allow for in situ analysis of the form/morphology of the crystals.

The membrane can be formed of any suitable material. It is desirable that the membrane be compatible with the other components of the system, as well as the parameters of a system (e.g., flow pressures, flow rates, etc.) Suitable membrane materials include, for example, polyesters.

The membrane can have any suitable porosity. Typically, the porosity of the membrane is less than 1 micron (e.g., 0.9, 0.8, 0.7, 0.6, 0.4, 0.3, 0.2, or 0.1 microns).

In some embodiments, the porosity of the membrane is less than 0.4 microns.

Multi-Well Format

In some embodiments, the microfluidic system includes a plurality of microfluidic chambers, wherein the inlets and outlet(s) of each microfluidic chamber are adapted to be selectively operated at controlled conditions (e.g., temperature, flow rate, solute concentration) to vary the supersaturation in each microfluidic chamber to facilitate high throughput screening of crystal formation under different conditions.

When the disclosed microfluidic system is configured as a multi-well format, the system provides a multi-well continuous, well-mixed microfluidic device for screening form, morphology, and growth rates of a solute (e.g., L-histidine) at different supersaturations.

Auto-Stop

In some embodiments, the microfluidic chamber is sized and shaped to provide unmonitored polymorph screening.

In some embodiments, the microfluidic system is adapted to provide an autostop mechanism during the screening process. In these embodiments, the geometry, dimensions, etc. of the microfluidic chamber are selected such that laminar flow through the microfluidic chamber at controlled supersaturation conditions causes solute crystals to form and accumulate in the trap zone, eventually growing to a point where the grown crystals obstruct the inlets and/or outlets, thereby automatically terminating flow through the device and allowing evaluation/screening of the grown crystals for their polymorph properties. Time-dependent growth and morphology evaluations can be performed during the crystallization process. At the point when crystal growth has progressed to the point that the chamber is substantially filled, no further time-dependent measurements are made, but grown crystals can be withdrawn from the chamber for characterizations of polymorph, morphology, and size. This configuration is desirable for characterizing polymorphs, morphology studies, and size studies.

Methods

The disclosed microfluidic system provides substantially continuous, well-mixed flow suitable for screening polymorphs and morphology in a supersaturated environment.

In an embodiment, the disclosure provides a method for screening crystalline polymorphs and morphology. The method includes (a) providing a microfluidic system as described herein, (b) introducing a first fluid stream including a solute dissolved in a solvent at a first flow rate and a first temperature into the first inlet zone, (c) when the second inlet zone is present, introducing a second fluid stream at a second flow rate and a second temperature in the second inlet zone, and (d) adjusting at least one of the first flow rate, the first temperature, the second flow rate, and the second temperature to obtain a supersaturated state within the microfluidic chamber.

In keeping with an aspect of the disclosed method, one or more parameters (e.g., flow rates, temperature, pressures, etc.) of the method is adjusted to achieve the desired supersaturation state (e.g., supersaturation ratio). If the supersaturation ratio is too low, crystals may not form or may form in an undesired part of the system. Similarly, if the supersaturation ratio is too high, then crystals may form in an undesired part of the system.

The supersaturation ratio within the microfluidic chamber typically is 1 or more, for example, 1.1 or more, 1.2 or more, 1.3 or more, 1.4 or more, 1.5 or more, 1.6 or more, 1.7 or more, 1.8 or more, 1.9 or more, 2 or more, 2.1 or more, 2.2 or more, 2.3 or more, 2.4 or more, 2.5 or more, 2.6 or more, 2.7 or more, 2.8 or more, 2.9 or more, 3 or more, 3.1 or more, 3.2 or more, 3.3 or more, 3.4 or more, 3.5 or more, 3.6 or more, 3.7 or more, 3.8 or more, 3.9 or more, or 4 or more. Alternatively, or in addition, the supersaturation ratio within the microfluidic chamber typically is 8 or less, for example, 7.9 or less, 7.8 or less, 7.7 or less, 7.6 or less, 7.5 or less, 7.4 or less, 7.3 or less, 7.2 or less, 7.1 or less, 7 or less, 6.9 or less, 6.8 or less, 6.7 or less, 6.6 or less, 6.5 or less, 6.4 or less, 6.3 or less, 6.2 or less, 6.1 or less, 6 or less, 5.9 or less, 5.8 or less, 5.7 or less, 5.6 or less, 5.5 or less, 5.4 or less, 5.3 or less, 5.2 or less, 5.1 or less, 5 or less, 4.9 or less, 4.8 or less, 4.7 or less, 4.6 or less, 4.5 or less, 4.4 or less, 4.3 or less, 4.2 or less, or 4.1 or less.

Accordingly, the supersaturation ratio within the microfluidic chamber can be a value bounded by any one of the aforementioned endpoints, for example, from 1-8, 1.1-7.9, 1.2-7.8, 1.3-7.7, 1.4-7.6, 1.5-7.5, 1.6-7.4, 1.7-7.3, 1.8-7.2, 1.9-7.1, 2-7, 2.1-6.9, 2.2-6.8, 2.3-6.7, 2.4-6.6, 2.5-6.5, 2.6-6.4, 2.7-6.3, 2.8-6.2, 2.9-6.1, 3-6, 3.1-5.9, 3.2-5.8, 3.3-5.7, 3.4-5.6, 3.5-5.5, 3.6-5.4, 3.7-5.3, 3.8-5.2, 3.9-5.1, 4-5, 4.1-4.9, 4.2-4.8, 4.3-4.7, 4.4-4.5.

To achieve a desired supersaturation condition, one or more of the system parameters can be adjusted. Illustrative parameters that can be adjusted to achieve a desired supersaturation condition include flow rate(s), flow pressure(s), fluid stream temperature(s), concentration(s) of any of the components (e.g., antisolvent) in a fluid stream.

The fluid streams of the disclosed method can have any suitable flow rate(s). Typical flow rates are between 0.1 and 3 mL/min. Thus, the flow rate can be 0.1 mL/min or more, e.g., 0.2 mL/min, 0.3, 0.4, 0.5, 0.6, 0.7, 0.8, 0.9, 1, 1.1, 1.2, 1.3, 1.4, or 1.5 mL/min or more. Alternatively, or in addition, the flow rate can be 3 mL/min or less, e.g., 2.9 mL/min, 2.8, 2.7, 2.6, 2.5, 2.4, 2.3, 2.2, 2.1, 2, 1.9, 1.8, 1.7, or 1.6 mL/min or less. Accordingly, the flow rate(s) can be a value bounded by any one of the aforementioned endpoints (e.g., 0.1-3 mL/min, 0.2-2.9, 0.3-2.8, 0.4-2.7, 0.5-2.6, 0.6-2.5, 0.7-2.4, 0.8-2.3, 0.9-2.2, 1-2.1, 1.1-2, 1.2-1.9, 1.3-1.8, 1.4-1.7, or 1.5-1.6 mL/min.

In an embodiment, the flow rates are adjusted between 0.25-1 mL/min. In an embodiment, the pressures driving the corresponding flow rates can be up to 2 bar, or higher.

The fluid stream(s) temperature of the disclosed method can by any suitable temperature. Typically, the temperature of the fluid streams are adjusted between 20 and 70° C. (e.g., 21° C., 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69° C., as well as any range therein bounded by the aforementioned temperatures.

The fluid streams, as described herein, can include solute(s), solvent(s), antisolvent(s), additive(s), and any combination thereof. Each of the components of the fluid streams is present in any suitable amount and/or concentration such that the method provides the desired supersaturation state.

Fluid Stream

The first fluid stream includes a solute, a solvent, optionally an additive, and any combination thereof. In embodiments wherein there is only a first fluid stream, the first fluid stream includes a solute and solvent.

The second fluid stream, when present, include antisolvent. In addition, the second fluid stream can also further comprise any component of the first fluid stream depending on the configuration of the system.

Similarly, in a system configuration including a plurality n number of fluid streams, wherein n is greater than 1, any of the fluid streams can comprise the components described herein.

Solute

The solute of the disclosed method can include any suitable compound for crystallization. Suitable compounds as solutes include, for example, those compounds that can be dissolved in a suitable (e.g., compatible) solvent to obtain the desired supersaturation state to induce crystallization, as described herein.

Suitable solutes include compounds such as one or more of an active pharmaceutical ingredient (API), an agrochemical, a semiconductor material, a catalyst, and a metal-organic frameworks material.

In an embodiment, the solute includes an active pharmaceutical ingredient.

Suitable APIs include, for example, glutamic acid, histidine, amino benzoic acid, acetaminophen, ibuprofen, carbamazepine, stereoisomers and regioisomers thereof. Suitable agrochemicals include, for example, glyphosate. Suitable semiconductor materials include, for example, copper phthalocyanine (CuPc) and perovskite ($CaTiO_3$). Suitable catalysts include, for example, proteins (e.g., lysozymes), zeolites, Copper(I) oxide ($Cu_2O$) and $IrO_2$. Suitable metal-organic frameworks include, for example, HKUST-1, MOF-5.

Solvent

The solvent of the disclosed method can be any suitable solvent. Desirably, the solvent is compatible with the system and its components, as described herein.

In some embodiments, the solvent includes an organic solvent. Suitable organic solvents include, for example, 1,2-dimethoxyethane, 1,2-propanediol, 1,4-dioxane, 1-bromobutane, 2-methyltetrahydrofuran, acetic acid, acetone, acetonitrile, chlorobenzene, chloroform, cyclohexane, dimethylforamide, 1,3-dimethyl-2-imidazolidinone, dimethylsulfoxide, ethanol, ethyl acetate, formic acid, isobutyl acetate, isopropyl acetate, methylethyl ketone, methanol, methyl acetate, methylene chloride, methyl isobutyl ketone, monomethyl amine, methyl tert-butyl ether, n-butanol, n-heptane, nitromethane, N-methylpyrrolidone, o-xylene, pyridine, t-amyl alcohol, t-butanol, tetrahydrofuran, toluene, trimethylamine, and any combination thereof.

In some embodiments, the solvent includes water.

In some embodiments, the solvent includes a mixture of an organic solvent and water.

Antisolvent

The antisolvent of the disclosed method can be any suitable solvent. Desirably, the antisolvent is compatible with the system and its components, as described herein.

As will be understood, the antisolvent(s) is selected and paired with a suitable solvent and solute to provide a means for controlling or regulating the supersaturation state to a desired level. The solute has a lower solubility in the antisolvent under a given set of system parameters. Thus, increasing the concentration of antisolvent mixed with a solute solution induces precipitation of the solute from solution (e.g., crystallization, salting out, etc.).

In some embodiments, the antisolvent includes one or more organic solvents, for example, those listed above.

In some embodiments, the antisolvent includes water.

In some embodiments, the antisolvent includes a mixture of an organic solvent and water.

Additives

In some embodiments, one or more of the fluid streams includes an additive. Desirably, the additive is compatible with the system and its components, as described herein. The additives, when present, facilitate the regulation of the supersaturation state (e.g., supersaturation ratio).

The additive can be any suitable additive. Suitable additive includes, for example, pH modifying agents (e.g., acids and bases), buffers, seed crystals, and any combination thereof.

EXAMPLES

The following examples illustrate the disclosed apparatus, compositions, and methods, but are not intended to limit the scope of any claims thereto.

General Materials, Methods, and Manufacturing

Crystalline form A of L-histidine (chemical purity ≥99%), a crystalline form I of o-aminobenzoic acid (o-ABA), and anthranilic acid (chemical purity ≥98%) were purchased commercially. The solutions for antisolvent crystallization studies were prepared using deionized water (Sigma-Aldrich, 18 MΩ cm) and ethanol (Sigma-Aldrich, ACS 99.8%). Solubility measurements of L-histidine were conducted at room temperature (20° C.).

XRD Measurements

Figure 7:
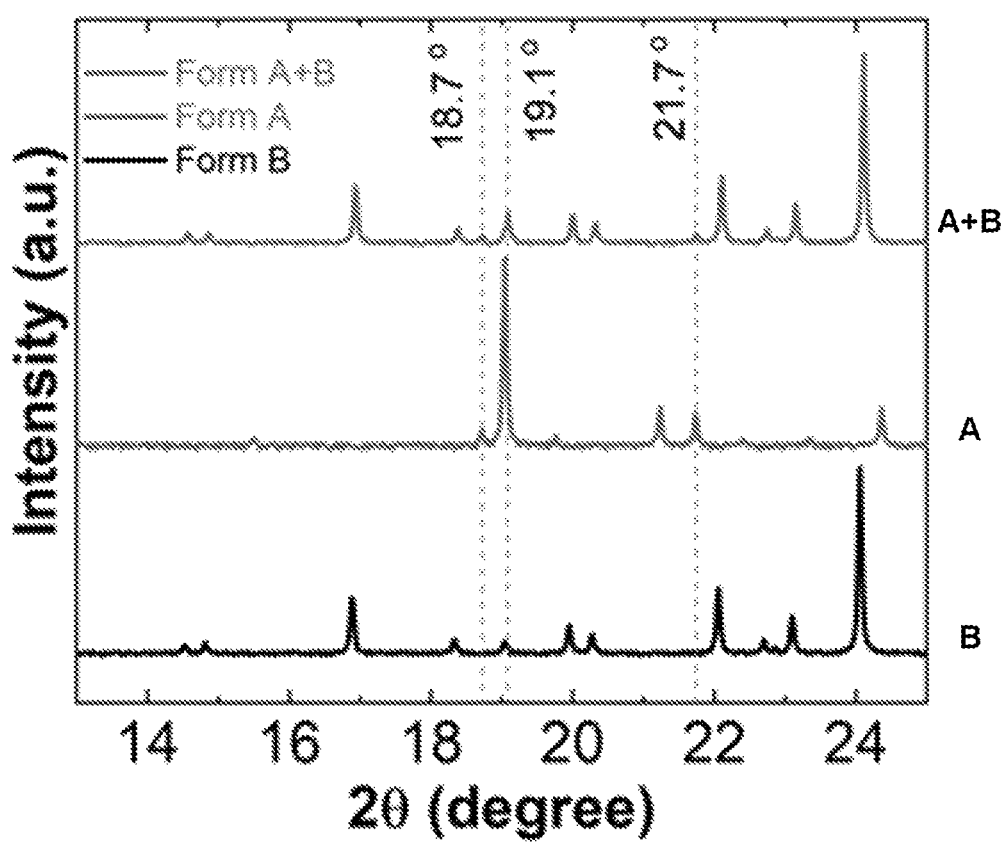
FIG. 7 illustrates the x-ray diffraction patterns of samples of L-histidine.

Unless otherwise specified, X-ray diffraction (XRD) measurements were conducted using a Bruker D2 PHASER diffractometer using Ni filtered Cu Kα radiation using a step width of 0.2° 2θ and a counting time of 5 s/step to enhance the signal to noise ratio. XRD Diffraction patterns of samples of L-histidine are provided in FIG. 7 for form A and form B of L-histidine.

Pressure Calculations

Pressure calculations of the inlet zones were conducted using multi-physics simulations using COMSOL MULTIPHYSICS to calculate the pressure profile in each inlet stream. The pressure calculations were validated using dye experiments. Nine syringes were filled with a dye solution in water of the known concentration, and nine other syringes were filled with pure water. Syringes were then placed into syringe pumps to inject the solutions into a continuous microfluidic device according to the disclosure and as modeled by the simulation. The ratio of the dye stream and pure water was adjusted from 0 percentage of added water to 90 percent. The outstream was then collected and the dye concentration was measured using a UV-vis spectrometer. After the streams were mixed inside the cylindrical zone, they were collected from the outlet stream to measure dye concentration. The measured values of the concentrations of dye in the mixture in each well were plotted against the assigned ratio of the flowrates and compared with the theoretical concentration based on the assigned flowrates. The measured values agreed with the theoretical values thereby confirming the simulation analysis of the merged inlet geometry.

L-His Solubility Calculations

Solubilities were calculated as described herein using the following equation:

$$C_{eq} = \frac{C_{initial} \times Q_1}{Q_1 + Q_2 + Q_3}$$

The solubility of form A of L-histidine was measured in different ratios of ethanol and water. A microfluidic system having a cyclone-shaped geometry was configured with 4 inlet zones, for example, as illustrated in FIG. 1, as follows: 2 of the inlet streams were saturated solutions of L-histidine, 1 stream of pure solvent (water) and 1 stream of pure antisolvent (ethanol). The flowrate of the ethanol ($Q_3$) was initially set to the desired ratio and maintained constant with respect to the summation of the flowrates for the solution of L-his in water ($Q_1$) and pure water ($Q_2$). After that starting from the highest ratio of the pure solvent, $Q_1$ was increased and consequently $Q_2$ was decreased. However, the summation of $Q_1$ and $Q_2$ was maintained constant. The point where crystals were formed within the microfluidic mixer was then considered as the maximum point, and then the several ratios before that value were checked to obtain the values of the flowrates of all three streams and measure the solubility.

Manufacturing

An exemplary procedure for manufacturing a microfluidic system in accordance with the disclosure is described herein. The disclosed microfluidic devices were designed in SOLIDWORKS (2018, Dassault Systems) and 3D printed using a stereolithography (SLA) 3D printer (form 2, Formlabs Inc., USA). The resin for 3D printing was clear resin FLGPCL02, which is activated for print by a 405 nm laser and provide a 150 µm of lateral and 25 µm of axial resolution. The clear resin (FLGPCL02) is chemically compatible with various organic solvents, including ethanol and water. To remove the residue of the resin inside the channels as well as outside of the 3D printed object, the devices were submerged in an isopropyl alcohol (IPA) (90%, Sigma-Aldrich) bath for 20 min. Next, channels were washed multiple times using a syringe filled with IPA to prevent blockage of the channels upon exposure to UV light. After completing washing steps, the device was cured with a ultraviolet lamp. The device was left open from the top and bottom and was covered with a microscopic cover slip to obtain the highest clarity. To improve the transparency of the exterior parts, wet sanding using 400-12,000 grit pads followed by spray painting was done.

Example 1—Polymorphs and Morphology of o-ABA

This example demonstrates a screening method of polymorphs and morphology of o-ABA in accordance with an embodiment of the disclosed method. The crystals were formed at room temperature using ethanol as solvent and water as antisolvent. The microfluidic system was configured to have a cyclone-shaped geometry.

The microfluidic device was placed on the temperature-controlled stage of the optical microscope (Olympus BX53M, Olympus America Inc.). The o-ABA dissolved in ethanol and pure water was pumped separately into the microfluidic device using programmed syringe pumps (NE-4000, New Era Pump System Inc.). The flow rates of the o-ABA-ethanol solution and pure water were adjusted to achieve the desired supersaturations (S=1.2, 1.9, and 2.5), which were determined using the solubility curve of form I of o-ABA crystals. The inlets of the microfluidic device were connected with one-way check valves to avoid backflow from the mixer. The time-lapse images of the crystallization compartment were recorded using a built-in color camera (LC 30, Olympus America Inc.) of the optical microscope under the reflected light mode, which are also processed using MATLAB (MATLAB 9.3, The MathWorks Inc.) to measure growth rates and particle size distribution. The polymorphs of o-ABA at different supersaturations (S=1.2, 1.9, and 2.5) were identified using (i) distinct morphological features, such as form I having a prismatic morphology whereas form II has a needle-like morphology, and (ii) X-ray diffraction (XRD) experiments on a Bruker DISCOVER diffractometer with Cu Kα radiation.

The polymorphs of o-ABA crystals obtained in the continuous-flow microfluidic device at these supersaturations were compared with those obtained from a batch process in a 96-well crystallizer. Alternatively, the crystals can be harvested from the crystallization compartment by uncovering the glass coverslip to identify polymorphs using Raman spectroscopy.

Example 2—Polymorphs and Morphology of L-Histidine and o-ABA

This example demonstrates a screening method of polymorphs and morphology of o-ABA and L-histidine in accordance with an embodiment of the disclosed method.

The o-ABA crystals were prepared using a procedure as described in Example 1.

The L-histidine crystals were formed at room temperature with water as the solvent and ethanol as the antisolvent, wherein the microfluidic system was configured to have a cyclone-shaped geometry.

The multi-well microfluidic mixer device was placed on a temperature-controlled stage of the optical microscope (Olympus BX53M, Olympus America Inc.). A saturated solution of L-histidine in water was prepared for the solubility measurement experiment at room temperature.

Eight different syringes were filled with solutions of L-histidine in the water at known concentrations as the source of solvent streams and the other eight syringes were filled with ethanol as antisolvent streams. Syringes were then inserted into 4 programmed syringe pumps (NE-4000, New Era Pump System Inc.). Inlets were connected to one-way microfluidic check valves to prevent backflow inside the channels.

All the microscopic images were recorded with a built-in color camera (LC 30, Olympus America Inc.) using reflected light mode. Capturing time-lapsed images and the growth rate analysis was performed for different samples. Further, these images were processed through MATLAB (MATLAB 9.3, The MathWorks Inc.) for form percentage measurements. L-histidine has two polymorphic form with different crystal habits reported in the literature.

It was observed that both L-histidine and o-ABA have form and morphology related to each other.

Example 3—Screening of Polymorphs and Morphology of L-Histidine in the Multi-Well Microfluidic Mixer System This example demonstrates a system and method in accordance with an embodiment of the disclosure, wherein the microfluidic system is configured to be in a multi-well format.

After benchmarking the merged inlet geometry and observing the consistency between the two discussed geometry, the multiwell screening system 10 generally shown in FIG. 4 and using the eight microfluidic chambers 100 having the merged inlet geometry of FIG. 5 was used to perform a parallel screening of L-histidine.

With eight different microfluidic mixers accommodated on a single chip, eight different supersaturations were studied for polymorph and morphology screening of L-histidine. The results of the continuous flow microfluidic crystallizer were further compared with a batch 96 well plate system with single injection of the solutions in a 96 well plate system. Supersaturation adjustments were done by either changing the initial concentration of the API solution and maintaining a constant ratio for the solvent and antisolvent (1:1) or varying the ratios of two mixing streams for constant initial concentration of API in the solvent. Ratios of solvent and antisolvent were controlled by controlling the flowrates of each stream, respectively.

L-histidine with the two polymorphic forms of form A (stable) and form B (metastable) was selected for the parallel screening. The disclosed microfluidic system provides for the instantaneous, in-situ analysis of the polymorphic change. The studied supersaturations were divided into three regions of low, medium and high supersaturations to understand the effect of the supersaturation ratio on the polymorphic form ratios. Supersaturation from 1 to 1.9 was considered as low, 2 to 2.3 was moderate and more than 2.3 was considered as high supersaturation ranges.

Figure 8:
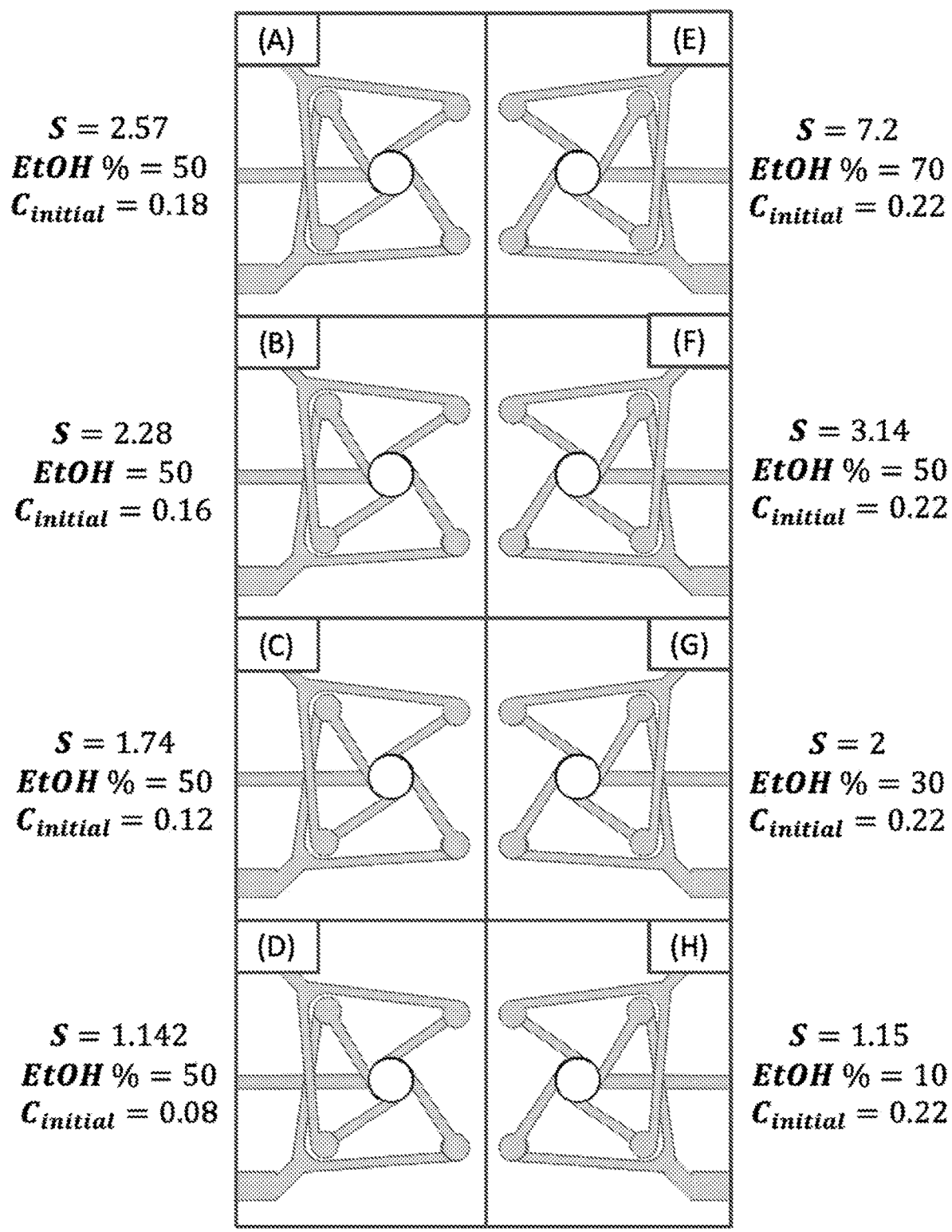
FIG. 8 illustrates the supersaturation ratios of L-histidine in a multi-well microfluidic mixer system.
Figure 9:
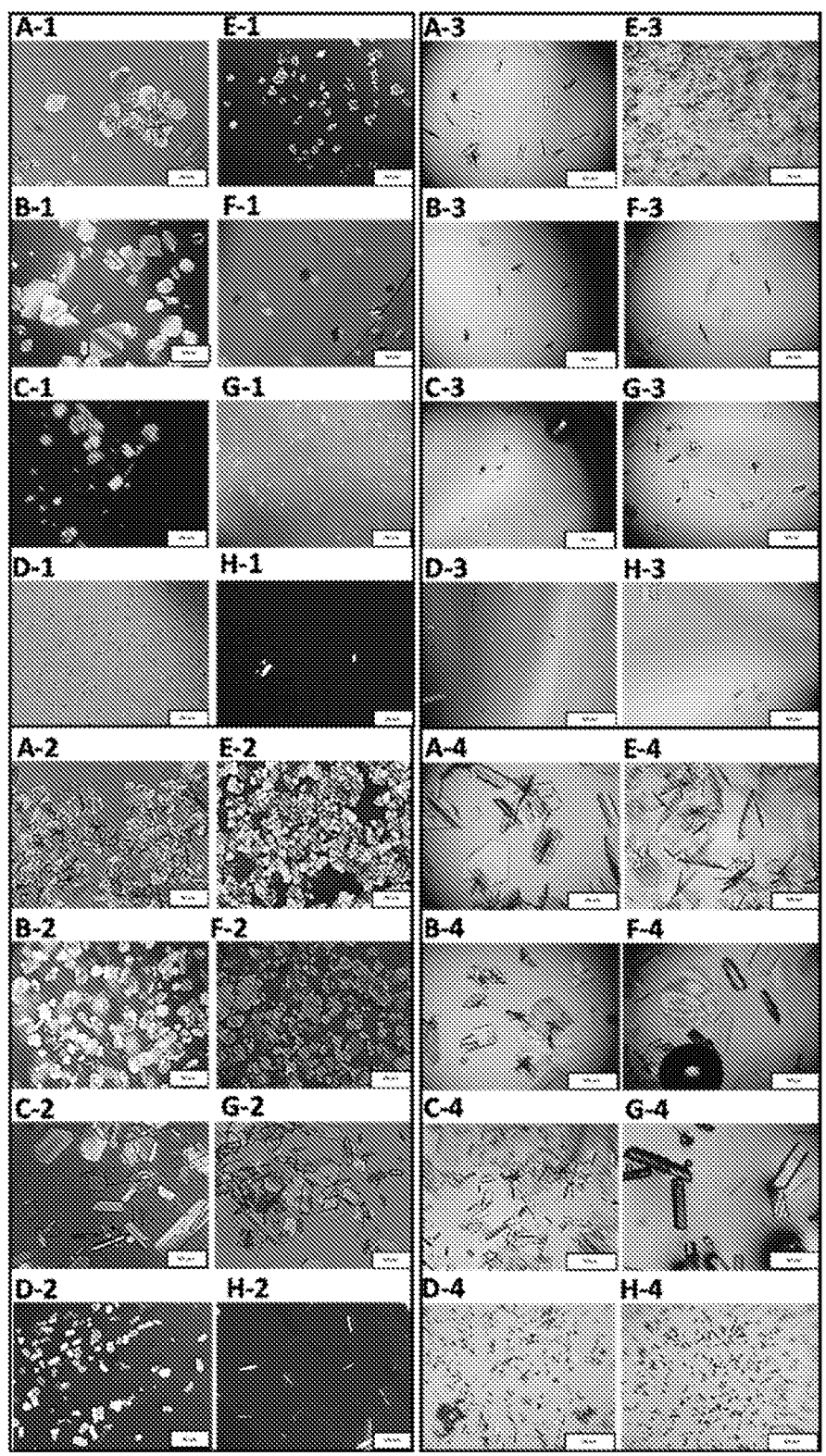
FIG. 9 illustrates micrographs from the screening of polymorphs and morphology of L-histidine in a multi-well microfluidic mixer system.

Details of the imposed supersaturation to each well along with the initial concentration and the flowrate ratios are listed in FIG. 8. FIG. 9 illustrates the micrographs A1 to H1 and A3 to H3 are showing the obtained crystals in the multi-well system after 5 and 30 minutes, respectively.

A low supersaturation degree existed in the wells D, C, and H, where supersaturation was respectively 1.74, 1.14 and 1.15. For a medium range of the supersaturations, well B with S=2.28 and well G with S=2 were evaluated. The other three remaining wells, A, E and F represents the high supersaturation range with S=2.57, 7.2, 3.14 respectively.

Identical supersaturations for wells A to H were applied to a batch 96 well plate and optical images were collected after 5 and 30 minutes and shown in the micrographs A2 to H2 and A4 to H4. For supersaturations below 2.3 in the microfluidic mixer which covers the low and medium supersaturation ranges, a mixture of forms A and B. As the supersaturation ratio increases, the ratio of form B increase. However, for the samples with supersaturations higher than 2.3, the mixture only crystallizes in form B. The results from the continuous flow method was compared with the results with the batch system, the trend for the polymorphic ratio was not the same as the continuous flow system.

Without wishing to be bound to any particular theory, it is believed that due to the lack of proper mixing and stagnant nature of the 96 well plate, the supersaturation ratio does not remain constant within the zone of crystallization. Moreover, the supersaturation is depleted over time as the crystals growth, which makes it impossible to impose a constant value during the growth process. As a result, the polymorphic transition occurs and crystals of the metastable form, which were formed at higher supersaturations, transformed into the more stable forms. Here, in the batch system, for the high supersaturation, the samples were still a mixture of both polymorphic forms, which confirms the polymorphic transformation of the metastable form into the stable form.

In contrast, the identical supersaturation conditions in the disclosed microfluidic mixer resulted into the formation of pure metastable crystals. Additionally, the crystal size distribution is significantly from the continuous system analysis. Crystals obtained from the 96 well plate system has a wide range of size distribution. However, the samples of the continuous microfluidic mixer system are more uniform and have a narrower size distribution. Without wishing to be bound to any particular theory, it is believed that this difference is a direct effect of the homogeneous mixing that exist in the continuous system. The homogeneous concentration profile within the mixer provides the chance for growing larger to all the crystals and tune in the particle size distribution.

Example 4—Growth Rate and Stable Form Percentage ($X_A\%$)

Figure 10:
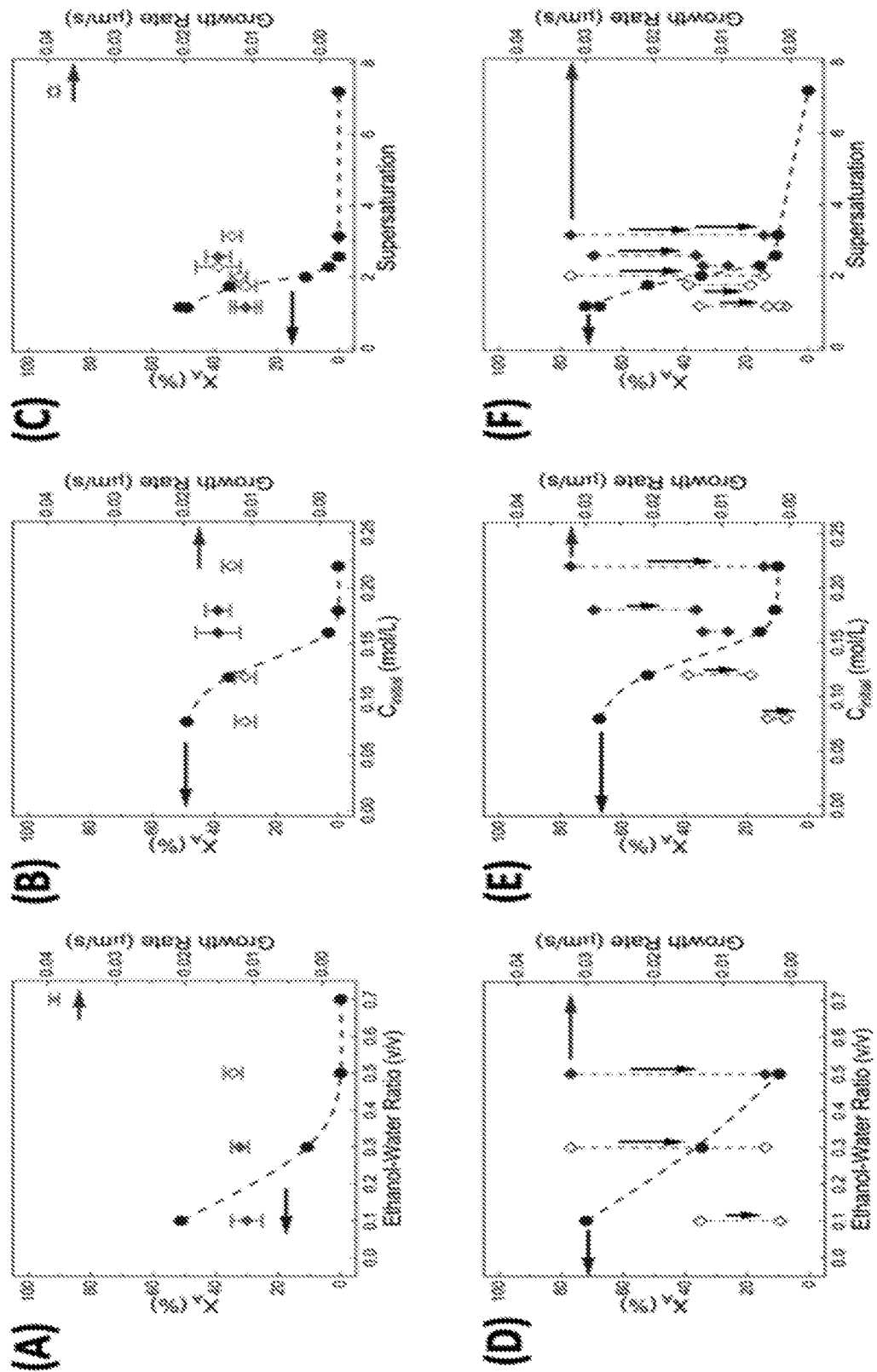
FIG. 10 illustrates measured percentage of polymorph A and growth rate of L-histidine crystals in a microfluidic mixer with respect to (panel A) ethanol-water ratio (panel B) initial concentration of the L-histidine in water and (panel C) supersaturation; and percentage of polymorph A and growth rate of L-histidine crystals in the 96-well plate with respect to (panel D) ethanol-water ratio (panel E) initial concentration of the L-histidine in water and (panel F) supersaturation.

In order to measure the growth rate for polymorphs of L-histidine at different supersaturations, time-lapsed images of each sample were taken each 60, 120 or 300 seconds after the crystals were first observed within the crystallization zone. Since the polymorphic form B crystals were exhibiting different morphologies in the optical images, the growth rate this polymorph was measured by measuring the distance between (111) faces. To confirm the crystal faces, the crystallography of the polymorph B was imported into WINXMORPH and 3 final models were simulated for existing form B in the samples. The growth rate measurements of the form A crystals, however was done by measuring the distance between the two longest faces due to the significant aspect ratio of the two dominant faces of this crystal form. Using MATLAB (MATLAB 9.3, The MathWorks Inc.) the ratio of the polymorphic form A was measured for the eight samples in both continuous flow crystallizer as well as the batch 96 well plate system. FIG. 10 shows measured growth rates as well as $X_A\%$ for eight samples both in a microfluidic mixer and a 96 well plate. In panels A and D of FIG. 10, the change of the polymorphic form A and crystal growth rates are shown with respect to changing the ethanol-water ratio in the microfluidic mixer as well as the 96 well plate system. In both systems, with increasing the ethanol-water ratio, the supersaturation ratio increases, and the samples are more of the metastable form B. However, at the higher supersaturations (S>2.3) only in the microfluidic mixer, the mixture crystallizes in the form B crystals and is a mixture of the form A and B in the batch system. In panels B and E of FIG. 10, the effect of the changing the initial concentration on the $X_A\%$ and growth rate is indicated. Similar to panels A and B, increasing the initial concentration results in higher supersaturation ratios and eventually, more crystals of the metastable form. Additionally, the measured growth rates for the samples of the continuous microfluidic mixer, show that the growth rates for the samples of similar supersaturation are almost constant, while for the identical samples, the growth rates are not fitting in a narrow range and decrease significantly over the time of the measurements. Moreover, generally, the percentage of the form A is significantly higher for the samples that were collected from the batch system comparing to the continuous microfluidic mixer. This occurs as a result of the polymorphic transformation of the metastable polymorphs B into the stable polymorphs after 30 minutes of the crystallization.

Example 5—Comparing Multi-Well Device Using o-ABA (Morphology and Polymorph)

Figure 11:
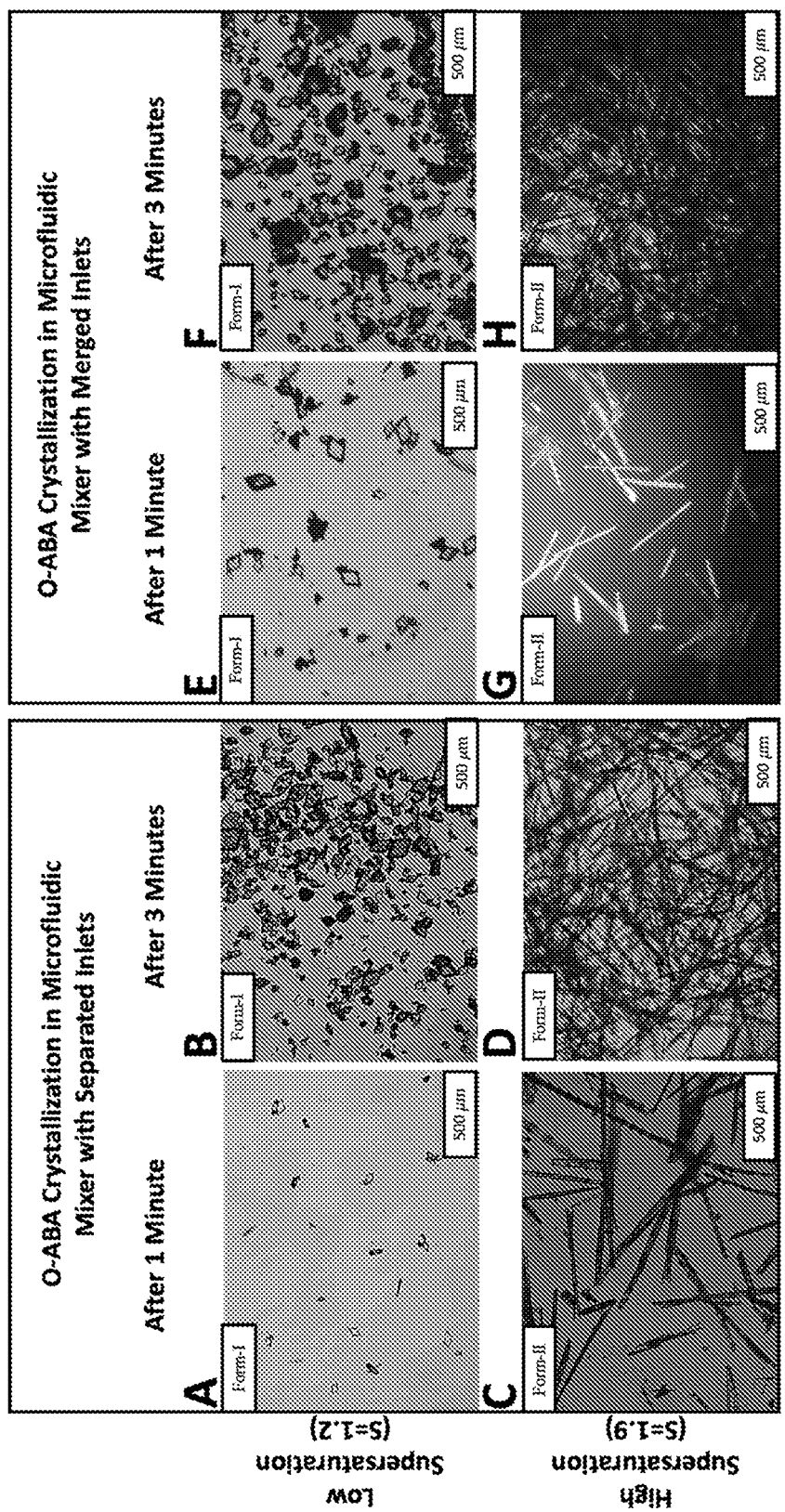
FIG. 11 illustrates the results of comparing antisolvent crystallization of o-ABA in a merged inlet design and a separated inlet design.

The antisolvent crystallization of o-ABA was studied with a merged inlet design (FIG. 5) and results were compared with a separated inlet design. FIG. 11, panels A-H show the micrographs of the samples obtained from antisolvent crystallization of o-ABA in the ethanol-water mixture at two different supersaturations (S=1.2 and S=1.9). The relative relationship between the form and morphology of o-ABA allows for instant detection of each polymorph with the in-situ analysis.

This compound has two polymorphic forms, where the second form II is the metastable form and has a needle shape morphology. However, the stable form I has a prismatic morphology which is easily distinguishable from the needle-shaped crystals. At lower supersaturations, crystals of polymorphic form I are obtained while at higher supersaturations, metastable form II polymorphs were formed. Due to the homogeneous mixing and constant supersaturation characteristic of the microfluidic mixer, the polymorphic forms did not change throughout the course of the experiments. The experiments were repeated with identical supersaturations in the merged inlets geometry, and optical images for samples after one and three minutes were collected and shown in FIG. 11. Panels A, B, E, and F show the prismatic crystals of the stable form I. For S=1.9, metastable form II was obtained in the merged inlets geometry (panel G) and did not transform to the stable form.

Embodiments

In embodiment (1) is presented a microfluidic system comprising:
(a) a microfluidic chamber comprising:
(i) a first inlet zone (e.g., first thermalizer zone) in fluid communication with a first inlet adapted to receive a first fluid stream comprising a solute dissolved in a solvent,
(ii) optionally a second inlet zone (e.g., second thermalizer zone) in fluid communication with a second inlet adapted to receive a second fluid stream (e.g., comprising an antisolvent for solvent/antisolvent crystallization, or comprising a solute/solvent mixture for multi-inlet cooling crystallization),
(iii) a passive mixing zone having (or defining) (A) a first mixing zone boundary and (B) a second mixing zone boundary separate from the first mixing zone boundary, the passive mixing zone being in (direct) fluid communication with the first inlet zone via the first mixing zone boundary and, when present, the second inlet zone via the first mixing zone boundary,
(iv) a trap zone having (or defining) a trap zone boundary in (direct) fluid communication with the second mixing zone boundary (e.g., where the trap zone boundary and the second mixing zone boundary are the same), wherein the trap zone is positioned within the microfluidic chamber such that fluid flowing through the microfluidic chamber (e.g., at Stokes number <<1) has a sufficiently low velocity to retain solute crystals formed in the trap zone within the trap zone (e.g., the trap zone is an essentially stagnant zone such that crystal particles formed therein are not carried out of the trap zone by the flowing fluid),
(v) an outlet zone (e.g., diffuser zone) in fluid communication (A) with the passive mixing zone via the first mixing zone boundary, and (B) an outlet adapted to discharge fluid from the microfluidic chamber, and
(vi) optionally a first temperature control means for adjusting the temperature of the first fluid stream (when present) to a first pre-selected value before entering the passive mixing zone;
wherein the microfluidic chamber comprises at least one of the second inlet zone and the first temperature control means.

In embodiment (2) is presented the microfluidic system of embodiment 1, wherein the microfluidic chamber comprises the second inlet zone.

In embodiment (3) is presented the microfluidic system of any embodiment 2, wherein:
the microfluidic chamber comprises the first temperature control means; and
the microfluidic chamber further comprises a second temperature control means for adjusting the temperature of the second fluid stream (when present) to a second pre-selected value before entering the passive mixing zone.

In embodiment (4) is presented the microfluidic system of any one of embodiments 1-3, further comprising:
(b) a solvent reservoir in fluid communication with the first inlet zone via the first inlet, the solvent reservoir containing therein the solute dissolved in the solvent; and
(c) an antisolvent reservoir in fluid communication with the second inlet zone via the second inlet, the antisolvent reservoir containing therein the antisolvent.

In embodiment (5) is presented the microfluidic system of any one of embodiments 1-4, wherein the microfluidic chamber comprises the first temperature control (e.g., and does not include the second inlet zone).

In embodiment (6) is presented the microfluidic system of any one of embodiments 1-5, further comprising:
(b) a solvent reservoir in fluid communication with the first inlet zone via the first inlet, the solvent reservoir containing therein the solute dissolved in the solvent.

In embodiment (7) is presented the microfluidic system of any one of embodiments 1-6, wherein the microfluidic system is configured to provide substantially continuous, well-mixed flow for screening crystalline polymorphs and morphology in a supersaturated environment.

In embodiment (8) is presented the microfluidic system of any one of embodiments 1-7, wherein the passive mixing zone is adapted to provide counter diffusion mixing, rotational mixing, or a combination thereof.

In embodiment (9) is presented the microfluidic system of embodiment any one of embodiments 1-8, wherein the passive mixing zone is adapted to provide rotational mixing.

In embodiment (10) is presented the microfluidic system of any one of embodiments 1-9, wherein:
the microfluidic chamber defines an internal volume having a central axis (e.g., rotational axis for swirling flow therein) and a circular cross-section (e.g., a uniform/constant-radius circular cross-section for a cylindrical body, a variable-radius circular cross-section for a conical or other sloped-wall body, or a combination of shapes);
the passive mixing zone is positioned within an outer circumferential portion of the internal volume;
the trap zone is positioned at an inner axial portion of the internal volume (e.g., along the central axis, with the trap zone boundary/second mixing zone boundary being the interface between the passive mixing zone and the trap zone);
the first inlet zone, the second inlet zone (when present), and the outlet zone are positioned at an outer circumferential portion of the internal volume (e.g., at the outer wall/boundary of the internal volume, which can correspond to the first mixing zone boundary).

In embodiment (11) is presented the microfluidic system of any one of embodiments 1-10, wherein the microfluidic chamber comprises:
a plurality of first inlet zones (e.g., first thermalizer zones) in fluid communication with a plurality of first inlets adapted to receive a plurality of first fluid streams each comprising a solute dissolved in a solvent; and
a plurality of first temperature control means for adjusting the temperature of the first fluid streams (when present) to a first pre-selected value before entering the passive mixing zone.

In embodiment (12) is presented the microfluidic system of any one of embodiments 1-11, wherein the plurality of first inlet zones are circumferentially distributed around (e.g., at substantially equally distributed angular locations) and tangentially aligned relative to the internal volume of the microfluidic chamber.

In embodiment (13) is presented the microfluidic system of any one of embodiments 1-10, wherein the microfluidic chamber comprises:
a plurality of first inlet zones (e.g., first thermalizer zones) in fluid communication with a plurality of first inlets adapted to receive a plurality of first fluid streams each comprising a solute dissolved in a solvent; and
a plurality of second inlet zones (e.g., second thermalizer zones) in fluid communication with a plurality of second inlets adapted to receive a plurality of second fluid streams each comprising an antisolvent.

In embodiment (14) is presented the microfluidic system of any one of embodiments 1-13, wherein the plurality of first inlet zones and the plurality of second inlet zones are circumferentially distributed around (e.g., at substantially equally distributed angular locations) and tangentially aligned relative to the internal volume of the microfluidic chamber.

In embodiment (15) is presented the microfluidic system of any one of embodiments 1-14, wherein the passive mixing zone is adapted to provide counter diffusion mixing.

In embodiment (16) is presented the microfluidic system of any one of embodiments 1-15, wherein the microfluidic chamber is sized and shaped to provide unmonitored polymorph screening.

In embodiment (17) is presented the microfluidic system of any one of embodiments 1-16, wherein the system is adapted to provide an autostop mechanism during the screening process.

In embodiment (18) is presented the microfluidic system of any one of embodiments 1-17, wherein the microfluidic chamber is characterized by a Stokes number of less than 1.

In embodiment (19) is presented the microfluidic system of any one of embodiments 1-18, wherein the trap zone is not in direct fluid communication with the outlet zone.

In embodiment (20) is presented the microfluidic system of any one of embodiments 1-19, comprising a plurality of microfluidic chambers, wherein the inlets and outlet(s) of each microfluidic chamber are adapted to be selectively operated at controlled conditions (e.g., temperature, flow rate, solute concentration) to vary the supersaturation in each microfluidic chamber to facilitate high throughput screening of crystal formation under different conditions.

In embodiment (21) is presented the microfluidic system of any one of embodiments 1-20, further comprising a sensor for detecting one or parameters of the microfluidic system selected from the group consisting of solute concentration, a fluid stream temperature, a fluid stream flow rate, and combinations thereof.

In embodiment (22) is presented the microfluidic system of any one of embodiments 1-21, wherein the microfluidic chamber further comprises a membrane positioned between (A) the outlet zone and (B) the first inlet zone and the second inlet zone (when present).

In embodiment (23) is presented the microfluidic system of any one of embodiments 1-22, wherein the microfluidic chamber further comprises a patterned surface adapted to promote nucleation of crystals.

In embodiment (24) is presented the microfluidic system of any one of embodiments 1-23, wherein the microfluidic chamber is sized and shaped to provide a microtiter plate insert.

In embodiment (25) is presented as a method for screening crystalline polymorphs and morphology, the method comprising:
(a) providing the microfluidic system of any one of embodiments 1 to 25;
(b) introducing a first fluid stream comprising a solute dissolved in a solvent at a first flow rate and a first temperature into the first inlet zone;
(c) when the second inlet zone is present, introducing a second fluid stream (e.g., comprising an antisolvent) at a second flow rate and a second temperature in the second inlet zone;
(d) adjusting at least one of the first flow rate, the first temperature, the second flow rate, and the second temperature to obtain a supersaturated state within the microfluidic chamber, thereby inducing crystallization and solute crystal formation in the trap zone.

In embodiment (26) is presented the method of embodiment 26, comprising adjusting at least one of the first temperature and the second temperature.

In embodiment (27) is presented the method of embodiments 26 and 26, wherein the solute comprises a compound selected from the group consisting of an active pharmaceutical ingredient, an agrochemical, a semiconductor material, a catalyst, and a metal-organic frameworks material.

In embodiment (28) is presented the method of embodiment 26, wherein the solute comprises a pharmaceutical active ingredient.

In embodiment (29) is presented the method of any one of embodiments 26-28, wherein the solvent comprises an organic solvent.

In embodiment (30) is presented the method of embodiment 30, wherein the organic solvent is selected from the group consisting of 1,2-dimethoxyethane, 1,2-propanediol, 1,4-dioxane, 1-bromobutane, 2-methyltetrahydrofuran, acetic acid, acetone, acetonitrile, chlorobenzene, chloroform, cyclohexane, dimethylforamide, 1,3-dimethyl-2-imidazolidinone, dimethylsulfoxide, ethanol, ethyl acetate, formic acid, isobutyl acetate, isopropyl acetate, methylethyl ketone, methanol, methyl acetate, methylene chloride, methyl isobutyl ketone, monomethyl amine, methyl tert-butyl ether, n-butanol, n-heptane, nitromethane, N-methylpyrrolidone, o-xylene, pyridine, t-amyl alcohol, t-butanol, tetrahydrofuran, toluene, trimethylamine, and any combination thereof In embodiment (31) is presented the method of any one of embodiments 26-30, wherein the antisolvent comprises water.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the articles, compositions, processes, kits, or apparatus are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS SUMMARY 10 microfluidic system
100 microfluidic chamber
200 solvent reservoir
300 antisolvent reservoir
110 passive mixing zone
112 first mixing zone boundary
114 second mixing zone boundary
120 trap zone
122 trap zone boundary
130 internal volume
132 central axis
134 circular cross-section
136 outer circumferential portion 137 top surface cover
138 bottom surface cover
140 first inlet zone
142 first inlet
144 first temperature control means
146 first check valve
150 second inlet zone
152 second inlet
154 second temperature control means
156 second check valve
160 first outlet zone
162 first outlet
170 second outlet zone
172 second outlet
180 membrane

What is claimed is:

1. A microfluidic system comprising: (a) a microfluidic chamber comprising: (i) a first inlet zone in fluid communication with a first inlet adapted to receive a first fluid stream comprising a solute dissolved in a solvent,
(ii) a second inlet zone in fluid communication with a second inlet adapted to receive a second fluid stream,
(iii) a passive mixing zone having (A) a first mixing zone boundary and (B) a second mixing zone boundary separate from the first mixing zone boundary, the passive mixing zone being in fluid communication with the first inlet zone via the first mixing zone boundary and the second inlet zone via the first mixing zone boundary, (iv) a trap zone having a trap zone boundary in fluid communication with the second mixing zone boundary, wherein the trap zone is positioned within the microfluidic chamber such that fluid flowing through the microfluidic chamber has a sufficiently low velocity, and configured to retain solute crystals formed in the trap zone within the trap zone, (v) an outlet zone in fluid communication (A) with the passive mixing zone via the first mixing zone boundary, and (B) an outlet adapted to discharge fluid from the microfluidic chamber, and
(vi) a first temperature control means configured to adjust the temperature of the first fluid stream to a first pre-selected value before entering the passive mixing zone.

2. The microfluidic system of claim 1, wherein:
the microfluidic chamber further comprises a second temperature control means for adjusting the temperature of the second fluid stream to a second pre-selected value before entering the passive mixing zone.

3. The microfluidic system of claim 1, further comprising: (b) a solvent reservoir in fluid communication with the first inlet zone via the first inlet, the solvent reservoir containing therein the solute dissolved in the solvent; and (c) an antisolvent reservoir in fluid communication with the second inlet zone via the second inlet, the antisolvent reservoir containing therein the antisolvent.

4. The microfluidic system of claim 1, wherein the first temperature control means comprises a cooling apparatus configured to induce supersaturation and crystallization.

5. The microfluidic system of claim 1, further comprising: (b) a solvent reservoir in fluid communication with the first inlet zone via the first inlet, the solvent reservoir containing therein the solute dissolved in the solvent.

6. The microfluidic system of claim 1, wherein the microfluidic system is configured to provide substantially continuous, well-mixed flow for screening crystalline polymorphs and morphology in a supersaturated environment.

7. The microfluidic system of claim 1, wherein the passive mixing zone is adapted to provide counter diffusion mixing, rotational mixing, oscillatory flow, or a combination thereof.

8. The microfluidic system of claim 7, wherein the passive mixing zone is adapted to provide rotational mixing.

9. The microfluidic system of claim 8, wherein:
the microfluidic chamber defines an internal volume having a central axis and a circular cross-section;
the passive mixing zone is positioned within an outer circumferential portion of the internal volume;
the trap zone is positioned at an inner axial portion of the internal volume;
the first inlet zone, the second inlet zone, and the outlet zone are positioned at an outer circumferential portion of the internal volume.

10. The microfluidic system of claim 9, wherein the microfluidic chamber comprises:
a plurality of first inlet zones in fluid communication with a plurality of first inlets adapted to receive a plurality of first fluid streams each comprising a solute dissolved in a solvent; and
a plurality of first temperature control means for adjusting the temperature of the first fluid streams, when present, to a first pre-selected value before entering the passive mixing zone.

11. The microfluidic system of claim 10, wherein the plurality of first inlet zones are circumferentially distributed around and tangentially aligned relative to the internal volume of the microfluidic chamber.

12. The microfluidic system of claim 9, wherein the microfluidic chamber comprises:
a plurality of first inlet zones in fluid communication with a plurality of first inlets adapted to receive a plurality of first fluid streams each comprising a solute dissolved in a solvent; and
a plurality of second inlet zones in fluid communication with a plurality of second inlets adapted to receive a plurality of second fluid streams each comprising an antisolvent.

13. The microfluidic system of claim 12, wherein the plurality of first inlet zones and the plurality of second inlet zones are circumferentially distributed around and tangentially aligned relative to the internal volume of the microfluidic chamber.

14. The microfluidic system of claim 7, wherein the passive mixing zone is adapted to provide counter diffusion mixing.

15. The microfluidic system of claim 1, wherein the microfluidic chamber is sized and shaped to provide unmonitored polymorph screening.

16. The microfluidic system of claim 15, wherein the system is adapted to provide an autostop mechanism during the screening process.

17. The microfluidic system of claim 1, wherein the microfluidic chamber is characterized by a Stokes number of less than 1.

18. The microfluidic system of claim 1, wherein the trap zone is not in direct fluid communication with the outlet zone.

19. The microfluidic system of claim 1, comprising a plurality of microfluidic chambers, wherein the inlets and outlet(s) of each microfluidic chamber are adapted to be selectively operated at controlled conditions to vary the supersaturation in each microfluidic chamber to facilitate high throughput screening of crystal formation under different conditions.

20. The microfluidic system of claim 1, further comprising a sensor for detecting one or parameters of the microfluidic system selected from the group consisting of solute concentration, a fluid stream temperature, a fluid stream flow rate, and combinations thereof.

21. The microfluidic system of claim 1, wherein the microfluidic chamber further comprises a membrane positioned between (A) the outlet zone and (B) the first inlet zone and the second inlet zone, when present.

22. The microfluidic system of claim 1, wherein the microfluidic chamber further comprises a patterned surface adapted to promote nucleation of crystals.

23. The microfluidic system of claim 1, wherein the microfluidic chamber further comprises a check valve adapted to permit (i) one-way flow of fluid from the first inlet into the first inlet zone and (ii) one-way flow of fluid from the second inlet into the second inlet zone, when present.

24. The microfluidic system of claim 1, wherein the microfluidic chamber is sized and shaped to provide a microtiter plate insert.

25. A method for screening crystalline polymorphs and morphology, the method comprising:
(a) providing the microfluidic system of claim 1;
(b) introducing a first fluid stream comprising a solute dissolved in a solvent at a first flow rate and a first temperature into the first inlet zone;
(c) optionally, introducing a second fluid stream at a second flow rate and a second temperature in the second inlet zone; and
(d) adjusting at least one of the first flow rate, the first temperature, the second flow rate, and the second temperature to obtain a supersaturated state within the microfluidic chamber, thereby inducing crystallization and solute crystal formation in the trap zone.

26. The method of claim 25, comprising adjusting at least one of the first temperature and the second temperature.

27. The method of claim 25, wherein the solute comprises a compound selected from the group consisting of an active pharmaceutical ingredient, an agrochemical, a semiconductor material, a catalyst, and a metal-organic frameworks material.

28. The method of claim 25, wherein the solute comprises a pharmaceutical active ingredient.

29. The method of claim 25, wherein the solvent comprises an organic solvent.

30. The method of claim 29, wherein the organic solvent is selected from the group consisting of 1,2-dimethoxyethane, 1,2-propanediol, 1,4-dioxane, 1-bromobutane, 2-methyltetrahydrofuran, acetic acid, acetone, acetonitrile, chlorobenzene, chloroform, cyclohexane, dimethylformamide, 1,3-dimethyl-2-imidazolidinone, dimethylsulfoxide, ethanol, ethyl acetate, formic acid, isobutyl acetate, isopropyl acetate, methylethyl ketone, methanol, methyl acetate, methylene chloride, methyl isobutyl ketone, monomethyl amine, methyl tert-butyl ether, n-butanol, n-heptane, nitromethane, N-methylpyrrolidone, o-xylene, pyridine, t-amyl alcohol, t-butanol, tetrahydrofuran, toluene, trimethylamine, and any combination thereof.

31. The method of claim 25, wherein the second fluid stream is introduced and comprises an antisolvent comprising water.

32. The microfluidic system of claim 1, wherein the microfluidic chamber further comprises a transparent material adapted to facilitate optical interrogation of crystal growth in the microfluidic chamber.

33. The microfluidic system of claim 1, wherein the microfluidic chamber further comprises a removable cover adapted to facilitate removal of grown crystals from within the microfluidic chamber.

34. The microfluidic system of claim 33, wherein the removable cover comprises a patterned surface adapted to promote nucleation of crystals in the microfluidic chamber.

* * * * *